(12) United States Patent
Zhang et al.

(10) Patent No.: US 10,414,941 B2
(45) Date of Patent: Sep. 17, 2019

(54) COMPOSITION SUITABLE FOR PROTECTION COMPRISING COPOLYMER AND HYDROPHILIC SILANE

(71) Applicant: 3M INNOVATIVE PROPERTIES COMPANY, St. Paul, MN (US)

(72) Inventors: Yifan Zhang, Woodbury, MN (US); Alexandra L. Sevenich, Afton, MN (US); Lylien Tan, Maplewood, MN (US); Yu Yang, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 15/555,128

(22) PCT Filed: Mar. 2, 2016

(86) PCT No.: PCT/US2016/020442
§ 371 (c)(1),
(2) Date: Sep. 1, 2017

(87) PCT Pub. No.: WO2016/148917
PCT Pub. Date: Sep. 22, 2016

(65) Prior Publication Data
US 2018/0037767 A1    Feb. 8, 2018

Related U.S. Application Data

(60) Provisional application No. 62/132,948, filed on Mar. 13, 2015.

(51) Int. Cl.
*C11D 1/83* (2006.01)
*C11D 3/37* (2006.01)
(Continued)

(52) U.S. Cl.
CPC ............. *C09D 133/26* (2013.01); *C09D 5/00* (2013.01); *C09D 5/14* (2013.01); *C09D 7/45* (2018.01);
(Continued)

(58) Field of Classification Search
CPC ......... C11D 1/83; C11D 3/162; C11D 3/3719; C11D 3/3769
See application file for complete search history.

(56) References Cited

U.S. PATENT DOCUMENTS

| 4,152,165 A | 5/1979 | Langager |
| 4,338,377 A | 7/1982 | Beck |

(Continued)

FOREIGN PATENT DOCUMENTS

| EP | 0648823 | 4/1945 |
| EP | 0819742 | 1/1998 |

(Continued)

OTHER PUBLICATIONS

Griffin WC: "Calculation of HLB Values of Non-Ionic Surfactants," Journal of the Society of Cosmetic Chemists 5 (1954): 259.
(Continued)

*Primary Examiner* — Brian P Mruk
(74) *Attorney, Agent, or Firm* — Carolyn A. Fischer

(57) ABSTRACT

Compositions include a water-soluble copolymer, a hydrophilic silane compound, and in some embodiments surfactant dispersed in a liquid phase. Methods of using the compositions to coat and optionally clean a substrate are also disclosed.

19 Claims, 1 Drawing Sheet

(51) Int. Cl.
*C09D 133/26* (2006.01)
*C09D 5/00* (2006.01)
*C09D 7/65* (2018.01)
*C09D 7/45* (2018.01)
*C09D 7/63* (2018.01)
*C09D 5/14* (2006.01)
*C11D 3/00* (2006.01)
*C11D 3/16* (2006.01)
*C11D 3/48* (2006.01)

(52) U.S. Cl.
CPC .............. *C09D 7/63* (2018.01); *C09D 7/65* (2018.01); *C11D 3/0036* (2013.01); *C11D 3/162* (2013.01); *C11D 3/3773* (2013.01); *C11D 3/48* (2013.01)

(56) References Cited

U.S. PATENT DOCUMENTS

| | | | |
|---|---|---|---|
| 4,861,511 A | 8/1989 | Kaplan | |
| 5,412,011 A * | 5/1995 | Morris | C04B 28/26 427/409 |
| 5,714,453 A | 2/1998 | Neumiller | |
| 5,936,703 A | 8/1999 | Miyazaki | |
| 6,569,261 B1 | 5/2003 | Aubay | |
| 6,593,288 B2 | 7/2003 | Aubay | |
| 6,664,218 B1 | 12/2003 | Dastbaz | |
| 6,703,358 B1 | 3/2004 | Aubay | |
| 6,740,626 B2 | 5/2004 | Neumiller | |
| 6,767,410 B2 | 7/2004 | Aubay | |
| 6,924,260 B2 | 8/2005 | Aubay | |
| 6,955,834 B2 | 10/2005 | Rohrbaugh | |
| 7,326,304 B2 | 2/2008 | Cline | |
| 7,591,272 B2 | 9/2009 | Dastbaz | |
| 7,699,941 B2 | 4/2010 | Pivonka | |
| 7,700,540 B2 | 4/2010 | Scheuing | |
| 7,741,265 B2 | 6/2010 | Iverson | |
| 7,745,383 B2 | 6/2010 | Dreja | |
| 8,088,724 B2 | 1/2012 | Iverson | |
| 8,227,394 B2 | 7/2012 | Zhu | |
| 8,853,301 B2 | 10/2014 | Jing | |
| 8,912,669 B2 | 12/2014 | Toyoda | |
| 2002/0174500 A1 | 11/2002 | Micciche | |
| 2003/0158076 A1 | 8/2003 | Rodrigues | |
| 2003/0216281 A1 | 11/2003 | DeLeo | |
| 2005/0148186 A1 | 7/2005 | Jung | |
| 2007/0105737 A1 | 5/2007 | Dastbaz | |
| 2007/0299177 A1 | 12/2007 | Serobian | |
| 2009/0107524 A1 | 4/2009 | Gross | |
| 2009/0135501 A1 | 5/2009 | Lee | |
| 2012/0029141 A1 | 2/2012 | Jing | |
| 2014/0060583 A1 | 3/2014 | Riddle | |

FOREIGN PATENT DOCUMENTS

| | | | | |
|---|---|---|---|---|
| WO | WO 2001-096511 | 12/2001 | | |
| WO | WO 2002-045010 | 6/2002 | | |
| WO | WO 2007-068870 | 6/2007 | | |
| WO | WO 2007-068939 | 6/2007 | | |
| WO | WO 2007-143344 | 12/2007 | | |
| WO | WO 2007-146680 | 12/2007 | | |
| WO | WO 2009-119690 | 10/2009 | | |
| WO | WO 2010/114698 | * 10/2010 | ............... | C09D 1/00 |
| WO | WO 2010-114698 | 10/2010 | | |
| WO | WO 2011-008658 | 1/2011 | | |
| WO | WO 2011-0163175 | 12/2011 | | |
| WO | WO 2014-036448 | 3/2014 | | |
| WO | WO 2014/036448 | * 3/2014 | ............... | C11D 3/16 |
| WO | WO 2015-116613 | 8/2015 | | |
| WO | WO 2015-116616 | 8/2015 | | |

OTHER PUBLICATIONS

International Search report for PCT International application No. PCT/US2016/020442 dated Jun. 27, 2016, 5 pages.

\* cited by examiner

COMPOSITION SUITABLE FOR PROTECTION COMPRISING COPOLYMER AND HYDROPHILIC SILANE

CROSS REFERENCE TO RELATED APPLICATIONS

This application is a national stage filing under 35 U.S.C. 371 of PCT/US2016/020442, filed Mar. 2, 2016, which claims the benefit of U.S. Provisional Application No. 62/132,948, filed Mar. 13, 2015, the disclosure of which is incorporated by reference in its/their entirety herein.

BACKGROUND

WO2014036448 describes a multi-functional composition and methods of use such as removing an unwanted constituent from a siliceous surface. The multi-functional composition (e.g., a cleaning and protecting composition) includes water, a hydrophilic silane, and a surfactant.

SUMMARY

Presently described are compositions suitable for providing long lasting protection from soil and stain accumulation. The composition comprises a liquid phase, a water-soluble polymer, or salt thereof; and a hydrophilic silane compound. The water-soluble polymer is typically a copolymer of an ethylenically unsaturated acidic monomer and an ethylenically unsaturated monomer comprising a nitrogen-containing terminal group, or salt thereof.

In some embodiments, the ethylenically unsaturated monomer comprising the nitrogen-containing terminal group is an acrylamide represented by the formula:

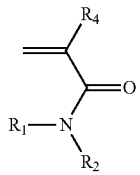

wherein $R_4$ is H or methyl; and
$R_1$ and $R_2$ are independently selected from H; $C_1$-$C_3$ alkyl; or $R_3SO_3H$, wherein $R_3$ is alkylene having 2 to 6 carbon atoms;

In other embodiments, the ethylenically unsaturated monomer comprising the nitrogen-containing terminal group comprises a quaternized ammonium group and is represented by the formula:

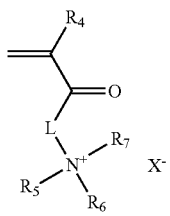

wherein $R_4$ is H or methyl;
L is a divalent atom or linking group;
$R_5$, $R_6$, and $R_7$ are independently selected from $C_1$-$C_3$ alkyl; and
$X^-$ is an anion.

In some embodiments, the composition is suitable for cleaning in combination with providing protection. In this embodiment, the composition further comprises a sufficient amount of surfactant.

In some embodiments, the inclusion of the water soluble copolymer is amenable to reducing the concentration of hydrophilic silane. In other embodiments, the inclusion of the water soluble copolymer is amenable to improving the protection properties (e.g. number of cycles before removal) of the dried composition.

DETAILED DESCRIPTION

Figure 1:
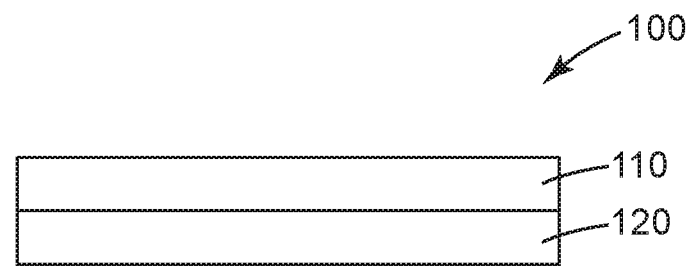
FIG. 1 is a schematic cross-sectional view of an exemplary article according to the present disclosure.

The protection compositions described herein comprise a water-soluble copolymer, or a salt thereof and a hydrophilic silane compound, dispersed in a (continuous) liquid phase. The cleaning and protection compositions further comprise surfactant(s).

The composition can be provided in a variety of forms including, e.g., as a concentrate that is diluted before use (e.g., with water, a solvent or an aqueous-based composition that includes an organic solvent) or as a ready-to-use liquid composition, a paste, a foam, a foaming liquid, a gel, and a gelling liquid.

The concentration of the primary components, i.e. the water-soluble copolymer (of an ethylenically unsaturated acidic monomer and an ethylenically unsaturated monomer comprising a nitrogen-containing terminal group, or salt thereof) hydrophilic silane compound, and surfactant when present will be expressed herein as a weight percentage based on the weight percent of solids of such components. As used herein, "solids" refers to the total weight of the (e.g. solid or liquid) components that remain after the (e.g. aqueous) liquid phase has evaporated. Since the weight percentage based on solids does not include the (e.g. aqueous) liquid phase, such weight percentage remains the same regardless of the dilution factor. Further, the weight percentage based on solids is also equivalent to the weight percentage of the dried protection coating that remains on the substrate or article after the composition has dried.

The aqueous liquid phase typically comprises at least 50, 60, 70, 80, or 90 percent by weight of water, or more. In some embodiments, the aqueous liquid phase is preferably essentially free of (that is, contains less than 0.1 percent by weight of based on the total weight of the aqueous liquid phase) organic solvents, especially volatile organic solvents. As used herein, "volatile organic solvent" refers to an organic solvent having a normal boiling point of 250° C. or less. However, non-volatile organic solvents may optionally be included in a minor amount if desired. In other embodiments, the liquid phase may comprise appreciable amount of solvents and smaller concentrations of water. For example, the liquid phase may comprise at least 5, 10, 15, 20, 25, 30, 35, 40, 45, or 50 percent by weight water.

The cleaning and protection composition is typically formulated in a ready-to-use form comprising at least 0.05, 0.06, 0.07, 0.08, 0.09, 0.10, 0.20, 0.30, 0.40 or 0.50% solids and 99.95 to 99.5 weight % aqueous liquid phase. The composition typically comprises the minimum amount of solid components that will provide the desired protection or desired cleaning and protection performance. In some embodiments, the total amount of solids is no greater than 5, 4, 3, 2, or 1 wt.-% solids. In yet other embodiments, the composition may be provided as a concentrate that is further diluted prior to use. In this embodiment, the total amount of solids may be considerably greater, for example at least 10, 15 20, 25, 30, 35 40, 45 or 50 weight % or greater of the liquid concentrate.

In some embodiments, the composition comprises at least one (e.g. anti-freeze) organic solvent for the purpose of depressing the freezing point below 0° C. Organic solvents include but are not limited to $C_1$-$C_6$ alkanols, and preferably $C_1$-$C_6$ diols and/or $C_3$-$C_{24}$ alkylene glycol ethers. $C_1$-$C_6$ alkanols include ethanol, n-propanol, isopropyanol, butanol, pentanol, and hexanol, and isomers thereof. $C_1$-$C_6$ diols include methylene, ethylene, propylene and butylene glycols. $C_3$-$C_{24}$ alkylene glycol ethers include mono-, di-, and tri-ethylene (propylene) glycol ethers and diethers such as ethylene glycol monopropyl ether, ethylene glycol monobutyl ether (Butyl Cellosolve, Dow Chemical Company also referred to as "Dow"), ethylene glycol monohexyl ether (Hexyl Cellusolve, Dow), propylene glycol n-propyl ether, propylene glycol monobutyl ether, propylene glycol t-butyl ether, propylene glycol phenyl ether (Dowanol PPh, Dow), diethylene glycol monoethyl ether, diethylene glycol monopropyl ether (Eastman DP Solvent, Eastman Chemicals), diethylene glycol monobutyl ether (Dowanol DB, Dow), dipropylene glycol n-propyl ether (Dowanol DPnP, Dow), dipropylene glycol n-butyl ether (Dowanol DPnB, Dow), triethylene glycol monomethyl ether (Methoxytriglycol, Dow), triethylene glycol monoethyl ether (ethoxytriglycol, Dow), triethylene glycol monobutyl ether (butoxytriglycol, Dow), tripropylene glycol methyl ether (Dowanol TPM, Dow), tripropylene glycol n-propyl ether (Dowanol TPnP, Dow), and tripropylene glycol n-butyl ether (Dowanol TPnB, Dow).

When present, the (e.g. alkylene glycol ether) organic solvents are preferably water-miscible or water-soluble at the concentration present. The kind and amount of such (e.g. alkylene glycol ether) organic solvents is selected such that the protection performance is not substantially reduced. When present the concentration of such solvents typically ranges from at least 0.25, 0.5, or 1 weight % to no greater than 5 or 10 weight % of the total aqueous composition, based on a reference composition comprising 97 weight % water. One of ordinary skill in the art can adjust the concentration of organic solvent for other dilution factors. For example, if the cleaning and protection solution is more concentrated, containing half as much liquid aqueous phase, the concentration of the organic solvent will be twice as much.

The aqueous liquid carrier can be acidic, basic, or neutral. The pH of the composition can be altered to achieve the desired pH using any suitable acid or base as is known in the art, including, e.g., organic acids and inorganic acids, or carbonates, such as potassium carbonate or sodium hydroxide.

In some embodiments, the compositions have a pH of less than 5, less than 4, or less than 3. In some embodiments, the compositions have a pH of at least 1, 1.5 or 2. In some embodiments, for example, those involving an acid sensitive substrate, it may be preferable to adjust the pH to a value of from about 5 to about 7.5.

The compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, formic acid, propionic acid, benzenesulfonic acid, glycolic acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. In some embodiments, the acid is an organic acid such as $CH_3OSO_3H$ (methane sulfonic acid). Combinations of organic and inorganic acids may also be used. In some embodiments, using weaker acids having a $pK_a$ of greater than 5 may not result in a uniform composition having the desirable properties such as transmissivity, cleanability and/or durability. In particular, compositions with weaker acids, or basic compositions, typically bead up on the surface of a polymeric substrate.

In other embodiments, the compositions have a pH of greater than 8, 9, or 10. In some embodiments, the compositions have a pH no greater than 12 or 11.

The compositions comprise a water soluble polymer of an ethylenically unsaturated acidic monomer ("acidic monomer") and an ethylenically unsaturated monomer comprising a nitrogen-containing terminal group, or a salt thereof ("nitrogen monomer"). In typical embodiments, the polymerized acidic monomer forms an anion in the (e.g. aqueous) liquid medium of the composition. The polymerized monomer comprising the nitrogen-containing terminal group may be neutral, such as in the case of amide terminal groups. Alternatively, the polymerized monomer comprising the nitrogen-containing terminal group may be cationic in the liquid medium, such as in the case of quaternized ammonium terminal groups.

The water-soluble copolymer may be prepared by known polymerization techniques from the corresponding monomers, optionally with an additional neutralization step. Such copolymers are also commercially available.

The ethylenically unsaturated acidic monomer are typically $C_3$-$C_8$ carboxylic, sulfonic, sulfuric, phosphonic or phosphoric acids with monoethylenic unsaturation, their anhydrides and their salts which are soluble in water. The ethylenically unsaturated acidic monomer is most typically acrylic acid or methacrylic acid, i.e. in otherwords (meth) acrylic acid.

In some embodiments, the copolymer typically has a weight ratio of nitrogen monomer to acidic monomer in a range from 50:50 to 95:5. In some embodiments, the weight ratio of nitrogen monomer to acidic monomer is at least 60:40 or 65:35. In some embodiments, the weight ratio of nitrogen monomer to acidic monomer is no greater than 90:10 or 85:15 or 80:20 or 75:25.

In other embodiments, the copolymer has a weight ratio of nitrogen monomer to acidic monomer in a range from 50:50 to 5:95. In some embodiments, the weight ratio of nitrogen monomer to acidic monomer is at least 10:90 or 20:80. In some embodiments, the weight ratio of nitrogen monomer to acidic monomer is no greater than 45:65 or 40:60.

In some embodiments, the ethylenically unsaturated monomer comprising the nitrogen-containing terminal group is an acrylamide monomer represented by the formula

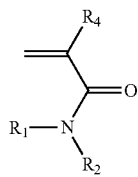

wherein $R_4$ is H or methyl; and
$R_1$ and $R_2$ are independently selected from H; $C_1$-$C_3$ alkyl; or $R_3SO_3H$, wherein $R_3$ is alkylene having from 2 to 6 carbon atoms (for example, ethylene, propylene, butylene, or hexylene). In some embodiments, $R_1$ and $R_2$ are both H. In some, embodiments, $R_1$ is H and $R_2$ is $R_3SO_3H$.

In some embodiments, the copolymer can be represented by the structure

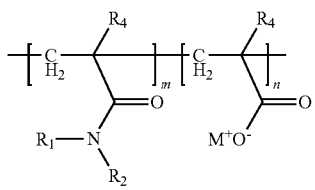

wherein $R_4$ is H or methyl; $R_1$ and $R_2$ are independently selected from H; $C_1$-$C_3$ alkyl; —$CH_2OH$ or $R_3SO_3H$, wherein $R_3$ is alkylene as previously described and $M^+$ is an (e.g. alkali metal) cation, such as sodium.

As evident from this structure, the cation ($M^+$) is generally associated with a polymerized unit or polymerized units derived from acrylic acid. Thus, the cation is not associated with the polymerized unit derived from the acrylamide. The polymerized acrylamide unit typically has a neutral charge and is not associated with a cation. However, in other embodiments, the amide group can be cationic.

In some embodiments, the ethylenically unsaturated monomer comprising the nitrogen-containing terminal group comprises a quaternized ammonium represented by the formula

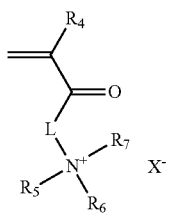

wherein $R_4$ is H or methyl;
L is a divalent atom or linking group;
$R_5$, $R_6$, and $R_7$ are independently selected from $C_1$-$C_4$ alkyl; and
$X^-$ is an anion, such as halide (e.g. chloride).

In one embodiment, the divalent linking group, L, has the formula $NH(CH_2)n$, wherein n ranges from 1 to 4 and in some embodiments is 3. Such monomer may be referred to as a quaternized ammonium acrylamide. In another embodiment L is oxygen. Copolymers comprising quaternized ammonium groups are described for example in U.S. Pat. Nos. 6,569,261 and 6,703,358; incorporated herein by reference.

In some embodiments, the copolymer can be represented by the structure

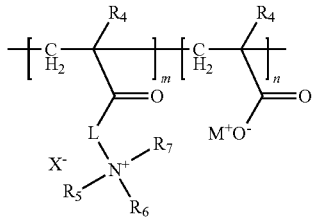

wherein $R_4$ is H or methyl;
L is a divalent atom or linking group;
$R_5$, $R_6$, and $R_7$ are independently selected from $C_1$-$C_4$ alkyl;

$X^-$ is a counterion, such as halide (e.g. chloride); and
$M^+$ is a cation.

Although not depicted in the structures above, the copolymer may optionally comprise other polymerized units that do not detract from the benefits provided by the water soluble copolymer.

Examples of commercially available copolymers of acrylic acid and acrylamide, and salts thereof, include those available from Polysciences, Inc. of Wallington, Pa. or other suppliers under the trade designations: POLY(ACRYLAMIDE/ACRYLIC ACID) 90:10, Na SALT MW 200,000; POLY(ACRYLAMIDE/ACRYLIC ACID) 70:30, Na SALT MW 200,000; POLY(ACRYLAMIDE/ACRYLIC ACID) 60:40, Na SALT MW >10,000,000; and POLY(ACRYLAMIDE/ACRYLIC ACID) 30:70, Na SALT MW 200,000. Additional examples include 2-propenoic acid, telomer with 2-methyl-2-[(1-oxo-2-propenyl)amino]-1-propanesulfonic acid monosodium salt and 2-propanol, sodium salt (CAS No. 130800-24-7) as available as AQUATREATAR-546 and sodium acrylate-sodium 2-acrylamido-2-methylpropanesulfonate copolymer (C.A.S. No. 37350-42-8) as available as AQUATREATAR-546 both from Alco Chemical of Chattanooga, Tenn. Another example includes copolymers of acrylic acid and acrylamide available from BASF Corporation, Florham Park, N.J. under the trade designation "LUREDUR", such as "LUREDUR AM NA". Other commercially available polymers are produced by Rhodia and sold under the trade designations "MIRAPOL SURF S" and "MIRAPOL SURF 5-210".

In some embodiments, the water-soluble copolymer may have a low cationic (e.g. sodium) species, as described in US2012/0029141. This may be accomplished by contacting the composition with a protonated cation exchange resin (that is, wherein the cations have been exchanged with protons). Exemplary cation exchange resins include AMBERLITE IR-120 PLUS(H) from Dow Chemical Co. The ion exchange step may be carried out in a batch-wise or continuous process (for example, using an ion exchange column). In such embodiment, the water-soluble polymer, i.e. prior to addition of surfactant, has a cation concentration (other than $H^+$ and $H_3O^+$) level of less than 100 parts per million by weight (ppm). In some embodiments, the water-soluble polymer, i.e. prior to addition of surfactant, has a cation concentration of less than 90, 80, 70, or 60 ppm, based on a total weight of the composition. This can be favored when the composition comprises (e.g. silica) nanoparticles. In typical embodiments, the water-soluble polymer has not been subjected to cation exchange. Thus, the cation concentration is typically greater than 90 or 100 ppm based on the aqueous reference composition prior to addition of the surfactants.

In some embodiments, the weight average molecular weight (Mw) of the copolymer, and salts thereof, is at least 25,000; 50,000; or 100,000 g/mole. In some embodiments, the molecular weight (Mw) of the copolymer, and salts thereof, is at least 125,000; 150,000; 200,000; or 250,000 g/mole. In some embodiments, the molecular weight of the copolymer, and salts thereof, is no greater than 1,000,000; 750,000; or 500,000 g/mole.

The cleaning and protection composition typically comprises the water soluble copolymer of an ethylenically unsaturated acidic monomer and ethylenically unsaturated monomer comprising a nitrogen-containing terminal group, or a salt thereof in an amount of at least 1, 2, 3, 4, 5, 6, 7, 8, 9, or 10 wt.-% solids based on the total amount of the described water soluble copolymer, hydrophilic silane, surfactant and alkali metal silicate when present. In some embodiments, the amount of water soluble copolymer is at least 15, 20, or 25 wt.-% solids. In some embodiments, the amount of water soluble copolymer is no greater than 50, 45, 40, or 35 wt.-% solids. When the composition is intended primarily for protection and comprises little or no surfactant, the amount of water soluble copolymer is typically higher. For example, the amount of water soluble copolymer is typically at least 25, 30, 35, 40, 45, or 50 wt.-% solids based on the total amount of water soluble copolymer, hydrophilic silane, and alkali metal silicate when present and may range up to 60, 65, 70, 75 wt.-% solids or greater.

The composition may optionally further comprise other water soluble polymers. In some embodiments, the composition further comprises acrylic acid homopolymer.

The compositions described herein comprise a hydrophilic silane. Suitable hydrophilic silanes are preferably water soluble and include, e.g., individual molecules, oligomers (typically less than 100 repeat units, and often only a few repeat units) (e.g., monodisperse oligomers and polydisperse oligomers), and combinations thereof, and preferably have a number average molecular weight no greater than (i.e., up to) 5000 grams per mole (g/mole), no greater than 3000 g/mole, no greater than 1500 g/mole, no greater than 1000 g/mole or even no greater than 500 g/mole.

The hydrophilic silane can be any one of a variety of different classes of hydrophilic silanes including zwitterionic silanes, non-zwitterionic silanes (e.g., cationic silanes, anionic silanes and nonionic silanes), silanes that include functional groups (e.g., functional groups attached directly to a silicon molecule, functional groups attached to another molecule on the silane compound, and combinations thereof), and combinations thereof. Useful functional groups include, e.g., alkoxysilane groups, siloxy groups (e.g., silanol), hydroxyl groups, sulfonate groups, phosphonate groups, carboxylate groups, gluconamide groups, sugar groups, polyvinyl alcohol groups, quaternary ammonium groups, halogens (e.g., chlorine and bromine), sulfur groups (e.g., mercaptans and xanthates), color-imparting agents (e.g., ultraviolet agents (e.g., diazo groups) and peroxide groups), click reactive groups, bioactive groups (e.g., biotin), and combinations thereof.

Examples of suitable classes of hydrophilic silanes that include functional groups include sulfonate-functional zwitterionic silanes, sulfonate-functional non-zwitterionic silanes (e.g., sulfonated anionic silanes, sulfonated nonionic silanes, and sulfonated cationic silanes), hydroxyl sulfonate silanes, phosphonate silanes (e.g., 3-(trihydroxysilyl)propyl methyl-phosphonate monosodium salt), carboxylate silanes, gluconamide silanes, polyhydroxyl alkyl silanes, polyhydroxyl aryl silanes, hydroxyl polyethyleneoxide silanes, polyethyleneoxide silanes, and combinations thereof.

One class of useful sulfonate-functional zwitterionic silanes has the following Formula (I):

$$(R^1O)p\text{-}Si(R^2)q\text{-}W\text{-}N^+(R^3)(R^4)\text{-}(CH_2)m\text{-}SO_3^- \quad (I)$$
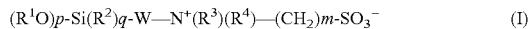

wherein:
each $R^1$ is independently a hydrogen, methyl group, or ethyl group;
each $R^2$ is independently a methyl group or an ethyl group;
each $R^3$ and $R^4$ is independently a saturated or unsaturated, straight chain, branched, or cyclic organic group, which may be joined together, optionally with atoms of the group W, to form a ring;

W is an organic linking group;
p is an integer from 1 to 3;
m is an integer from 1 to 4;
q is 0 or 1; and
p+q=3.

The organic linking group W of Formula (II) can be saturated and unsaturated, straight chain, branched, and cyclic organic groups and can include, e.g., alkylenes, alkylenes that include carbonyl groups, urethanes, ureas, organic linking groups substituted with heteroatoms (e.g., oxygen, nitrogen, sulfur, and combinations thereof), and combinations thereof. Suitable alkylenes include, e.g., cycloalkylenes, alkyl-substituted cycloalkylenes, hydroxy-substituted alkylenes, hydroxy-substituted mono-oxa alkylenes, divalent hydrocarbons having mono-oxa backbone substitution, divalent hydrocarbons having mono-thia backbone substitution, divalent hydrocarbons having monooxo-thia backbone substitution, divalent hydrocarbons having dioxo-thia backbone substitution, arylenes, arylalkylenes, alkylarylenes and substituted alkylarylenes.

Suitable examples of the zwitterionic functional group $-W-N^+(R^3)(R^4)-(CH_2)_m-SO_3^-$ include sulfoalkyl imidazolium salts, sulfoaryl imidazolium salts, sulfoalkyl pyridinium salts, sulfoalkyl ammonium salts (e.g., sulfobetaine), and sulfoalkyl piperidinium salts. Suitable zwitterionic silanes of Formula (I) are also described in U.S. Pat. No. 5,936,703 (Miyazaki et al.) and International Publication Nos. WO 2007/146680 and WO 2009/119690.

Another useful class of sulfonate-functional zwitterionic silanes includes sulfonate-functional zwitterionic silanes having the Formula (II):

$$(R^1O)p\text{-}Si(R^2)q\text{-}CH_2CH_2CH_2\text{-}N^+(CH_3)_2\text{-}(CH_2)m\text{-}SO_3^- \quad (II)$$
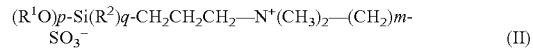

wherein:
each $R^1$ is independently a hydrogen, methyl group, or ethyl group;
each $R^2$ is independently a methyl group or an ethyl group;
p is an integer from 1 to 3;
m is an integer from 1 to 4;
q is 0 or 1; and
p+q=3.

Suitable examples of sulfonate functional zwitterionic silanes of Formula (II) are described in U.S. Pat. No. 5,936,703 (Miyazaki et al.), and include, e.g., $(CH_3O)_3Si-CH_2CH_2CH_2-N^+(CH_3)_2-CH_2CH_2CH_2-SO_3^-$; $(CH_3CH_2O)_2Si(CH_3)-CH_2CH_2CH_2-N^+(CH_3)_2-CH_2CH_2CH_2-SO_3^-$; and $(OH)_3SiCH_2CH_2CH_2N^+(CH_3)_2CH_2CH_2CH_2SO_3^-$.

Other suitable zwitterionic silanes include, e.g., $(OH)_3SiCH_2CH_2CH_2N^+(CH_3)_2CH_2CH_2CH_2CH_2SO_3^-$; $(OH)_3SiCH_2CH_2CH_2[C_5H_5N^+]CH_2CH_2CH_2SO_3^-$; $(OH)_3SiCH_2CH_2CH_2N^+(CH_3)_2CH_2CH_2(OH)CH_2SO_3^-$; $(CH_3O)_3SiCH_2CH_2CH_2N^+(CH_3CH_2)_2CH_2CH_2CH_2SO_3^-$; $(CH_3O)_3SiCH_2CH_2CH_2CH_2CH_2CH_2CH_2N^+(CH_3CH_2)_2CH_2CH_2CH_2SO_3^-$; $(CH_3CH_2O)_3SiCH_2CH_2CH_2NHCH(O)NHCH_2CH_2N^+CH_2CH_2CH_2SO_3^-$; and $(CH_3CH_2O)_3SiCH_2CH_2CH_2NHC(O)OCH_2CH_2OCH_2CH_2N^+(CH_3)_2CH_2CH_2CH_2SO_3^-$.

Another useful class of sulfonate-functional non-zwitterionic silanes has the following Formula (III):

$$[(MO)(Q_n)Si(XCH_2SO_3^-)_{3-n}]Y_{2/nr}^{+r} \quad (III)$$
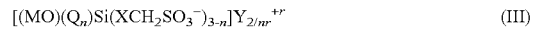

wherein:
each Q is independently selected from hydroxyl, alkyl groups containing from 1 to 4 carbon atoms and alkoxy groups containing from 1 to 4 carbon atoms;

M is selected from hydrogen, alkali metals, and organic cations of strong organic bases having an average molecular weight of less than 150 and a pKa of greater than 11;

X is an organic linking group;

Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that when Y is hydrogen, alkaline earth metals or an organic cation of a protonated weak base, M is hydrogen;

r is equal to the valence of Y; and n is 1 or 2.

Preferred non-zwitterionic silanes of Formula (III) include alkoxysilane compounds in which Q is an alkoxy group containing from 1 to 4 carbon atoms.

The silanes of Formula (III) preferably include is at least 30% by weight, at least 40% by weight, or even from about 45% by weight to about 55% by weight oxygen, and no greater than 15% by weight silicon, based on the weight of the compound in the water-free acid form.

Useful organic linking groups X of Formula (III) include, e.g., alkylenes, cycloalkylenes, alkyl-substituted cycloalkylenes, hydroxy-substituted alkylenes, hydroxy-substituted mono-oxa alkylenes, divalent hydrocarbons having mono-oxa backbone substitution, divalent hydrocarbons having mono-thia backbone substitution, divalent hydrocarbons having monooxo-thia backbone substitution, divalent hydrocarbons having dioxo-thia backbone substitution, arylenes, arylalkylenes, alkylarylenes, and substituted alkylarylens.

Examples of useful Y include 4-aminopyridine, 2-methoxyethylamine, benzylamine, 2,4-dimethylimidazole, and 3-[2-ethoxy(2-ethoxyethoxy)]propylamine, $^+N(CH_3)_4$, and $^+N(CH_2CH_3)_4$.

Suitable sulfonate-functional non-zwitterionic silanes of Formula (I) include, e.g., $(HO)_3Si-CH_2CH_2CH_2-O-CH_2-CH(OH)-CH_2SO_3-H^+$; $(HO)_3Si-CH_2CH(OH)-CH_2SO_3-H^+$; $(HO)_3Si-CH_2CH_2CH_2SO_3-H^+$; $(HO)_3Si-C_6H_4-CH_2CH_2SO_3-H^+$; $(HO)_2Si-[CH_2CH_2SO_3H^+]_2$; $(HO)-Si(CH_3)_2-CH_2CH_2SO3-H^+$; $(NaO)(HO)_2Si-CH_2CH_2CH_2-O-CH_2-CH(OH)-CH_2SO_3-Na^+$; and $(HO)_3Si-CH_2CH_2SO_3-K^+$ and those sulfonate-functional non-zwitterionic silanes of Formula (I) described in U.S. Pat. No. 4,152,165 (Langager et al.) and U.S. Pat. No. 4,338,377 (Beck et al).

The cleaning and protection composition typically comprises the hydrophilic silane in an amount of at least 1, 2, 3, 4, 5, 6, 7, 8, 9, or 10 weight % solids based on the total amount of the described water soluble copolymer, hydrophilic silane, surfactant and alkali metal silicate when present. In some embodiments, the amount of hydrophilic silane is no greater than 50, 45 or 40 weight %. In some embodiments, the amount of hydrophilic silane is no greater than 35, 30, 25 or 20 weight %. When the composition is intended primarily for protection and comprises little or no surfactant, the amount of hydrophilic silane is typically higher. For example, the amount of hydrophilic silane is typically at least 15, 20, or 25 weight % solids based on the total amount of water soluble copolymer, hydrophilic silane, and alkali metal silicate when present; and may range up to 35, 40, 45, or weight % solids or greater.

The weight ratio of the described water soluble polymer to hydrophilic silane can generally range from 1:25 to 25:1 or 20:1 or 15:1. In some embodiments, it is preferred to maximize the amount of the described water soluble copolymer and minimize the amount of hydrophilic silane. In this embodiments, the weight ratio of hydrophilic silane to water soluble copolymer is typically at least 1:1. In some embodiments, the weight ratio of hydrophilic silane to water soluble copolymer is at least 1:1.5, or 1:2 and may range up to 1:4 or 1:5.

In typical embodiments, the composition further comprises an alkali metal silicate, polyalkoxy silanes, or combinations thereof for the purpose of improving the bonding of the hydrophilic silane to the substrate, siliceous surfaces such as glass Examples of suitable water soluble alkali metal silicates include lithium silicate, sodium silicate, potassium silicate, alkyl polysilicates and combinations thereof. Examples of polyalkoxy silanes include poly(diethoxysiloxane), tetraalkoxysilanes (e.g., tetraethylorthosilicate (TEOS) and oligomers of tetraalkoxysilanes), and combinations thereof.

The weight ratio of alkali metal silicate and/or polyalkoxy silane to hydrophilic silane is generally at least 1:3, 1:4, or 1:5 and can range up to 5:1, 10:1, 15:1, 20:1, or 25:1.

In some embodiments, alkali metal silicate and/or polyalkoxy silane are present in an amount of at least 0.5, 1, 1.5, or 2 wt.-% solids based on the total amount of water soluble copolymer, hydrophilic silane, surfactant and alkali metal silicate. The amount of alkali metal silicate and/or polyalkoxy silane is typically no greater than 5, 4.5, 4, 3.5, or 3 wt.-% solids. When the composition is intended primarily for protection and comprises little or no surfactant, the amount of alkali metal silicate and/or polyalkoxy silane can be higher ranging up to 6, 7, 8, 9, or 10 wt.-% solids.

Is some embodiments, the protection compositions comprise little or no surfactant. However, the composition for cleaning and protection comprise surfactant(s). The term "surfactant" as used herein describes molecules with hydrophilic (polar) and hydrophobic (non-polar) segments on the same molecule, and which are capable of reducing the surface tension of the composition. Suitable surfactants include, e.g., anionic, nonionic, cationic, and amphoteric surfactants, and combinations thereof.

In some embodiments, the kind and amount of surfactant is selected such that in combination with the copolymer and hydrophilic silane, the compositions are preferably stable when stored in the liquid form (120° F. for 90 days), for example, they do not gel, increase in opacity, form precipitated or agglomerated particulates, or otherwise deteriorate significantly.

Typically the aqueous cleaning and protection composition described herein comprise the minimum amount of surfactant that will provide the desired cleaning performance. When the kind and amount of surfactants are properly selected, the surfactants provide good cleaning (no apparent residue) in combination with good protection performance. In some favored embodiments, the percent of dried coating composition removed, after 1, 2, 3, 4, or 5 cycles of the soap scum protection test, is less than or equal to 20% and in some embodiments no greater than 15%, 10%, 5%, or 0%. In some favored embodiments, the percent of dried coating composition removed after 6 cycles is less than or equal to 30% and in some embodiments no greater than 25%, 20%, 15%, or 10%. In some favored embodiments, the percent of dried coating composition removed after 7 cycles is less than or equal to 40% and in some embodiments no greater than 35%, 30%, 25%, 20%, or 15%. In some favored embodiments, the percent of dried coating composition removed after 8 cycles is less than or equal to 50% and in some embodiments no greater than 40%, 35%, 30%, 25%, 20%, or 15%. In some embodiments, at least 50% of the dried coating composition is retained (i.e. less than 50% removed) after 9, 10, 11, 12, 13 or 14 cycles.

Surfactants can be classified by the presence of formally charged groups in its head. The head of an ionic surfactant carries a net charge. A non-ionic surfactant has no charged groups in its head.

Surfactants can be characterized by various methodologies. One common characterization method, as known in the art, is the hydrophilic-lipophilic balance ("HLB"). Although various method have been described for determining the HLB of a compound, unless specified otherwise, as used herein HLB refers to the value obtained by the Griffin's method (See Griffin WC: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, Pa.).

According to Griffin's method:

$$HLB = 20 * Mh/M$$

where Mh is the molecular mass of the hydrophilic portion of the molecule, and M is the molecular mass of the whole molecule. This computation provides a numerical result on a scale of 0 to 20, wherein "0" is highly lipophilic.

Griffin's method is typically used to calculate the HLB of a single molecule. However, various (e.g. commercially available) non-ionic surfactants comprise a mixture of molecules. When the surfactant comprises a mixture of molecules, the HLB can be calculated by the summation of the HLBs of the individual molecules multiplied by the weight fraction of each molecule.

The surfactants of the composition described herein are generally more hydrophilic than lipophilic, i.e., have an HLB of greater than 10. In favored embodiments, the HLB is at least 11 or 12 and no greater than about 19 or 18. In some favored embodiments, the composition comprises surfactants having an HLB of less than 17, or 16, or 15.

The molecular weight of the surfactants is typically at least 150 g/mole and generally no greater than 500 or 600 g/mole. In some embodiments, the molecular weight of the surfactant is at least 200 g/mole, 250 g/mole, or 300 g/mole.

In some embodiments, the composition comprises at least one non-ionic surfactant. Nonionic surfactants have no ions and thus have no electric charge. Nonionic surfactants typically derive their polarity from having a (e.g. oxygen-rich) polar portion of the molecule at one end and a large organic molecule (e.g. alkyl or alkenyl group containing from 6 to 30 carbon atoms) at the other end. The oxygen component is usually derived from short polymers of ethylene oxide or propylene oxide.

Examples of useful nonionic surfactants include polyoxyethylene glycol ethers (e.g., octaethylene glycol monododecyl ether, pentaethylene monododecyl ether, poly-oxyethylenedodecyl ether, polyoxyethylenehexadecyl ether), polyoxyethylene glycol alkylphenol ethers (e.g., polyoxyethylene glycol octylphenol ether and polyoxyethylene glycol nonylphenol ether), polyoxyethylene sorbitan monoleate ether, polyoxyethylenelauryl ether, polyoxypropylene glycol alkyl ethers, glucoside alkyl ethers (e.g., decyl glucoside, lauryl glucoside, and octyl glucoside), glycerol alkyl esters, polyoxyethylene glycol sorbitan alkyl esters, monodecanoyl sucrose, cocamide, dodecyldimethylamine oxide, alkoxylated alcohol nonionic surfactants (e.g., ethoxylated alcohol, propoxylated alcohol, and ethoxylated-propoxylated alcohol). Useful nonionic surfactants include alkoxylated alcohol available under the trade designations NEODOL 23-3 and NEODOL 23-5 from Shell Chemical LP (Houston, Tex.), available under the trade designation TOMADOL 91-6 and 900 from Air Product (Allentown, Pa.), available under the trade designation IGEPAL CO-630 from Rhone-Poulenc, lauramine oxide available under the trade designation BARLOX LF from Lonza Group Ltd. (Basel, Switzerland), and alkyl phenol ethoxylates and ethoxylated vegetable oils available under the trade designation EMULPHOR EL-719 from GAF Corp. (Frankfort, Germany).

In some embodiments, the composition comprises an alkyl polysaccharide nonionic surfactant. Alkyl polysaccharides generally have a hydrophobic group containing from 6 to 30 carbon atoms and a polysaccharide, e.g., a polyglycoside, hydrophilic group containing from 1.3 to 10 saccharide units. Alkylpolyglycosides may have the formula: $R^2O(C_nH_{2n}O)_t(glycosyl)_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 8. In some embodiments, $R^2$ is an alkyl group having 6 to 18 and more preferably 10 to 16 carbon atoms. The glycosyl may be derived from glucose. In some embodiments, the hydrogel cleaning concentrate may comprise a combination of an alkyl polyglycoside and alkyl pyrrolidone as described in WO2007/143344; incorporated herein by reference. Commercially available alkyl polysaccharides surfactant include "GLUCOPON" series non-ionic surfactants, commercially available from BASF Corporation such as a mixture of alkyl polyglycosides and cocoglucosides available under the trade designation "GLUCOPON 425 N" surfactant.

In some embodiments, composition further comprises an anionic surfactant. Without intending to be bound by theory, it is surmised that the anionic surfactant may stabilize the mixture of water-soluble copolymer and silica nanoparticles.

Anionic surfactants contain anionic (i.e. negatively charged) functional groups at their head, such as sulfate, sulfonate, phosphate, and carboxylates in combination with a positively charged counterion.

Useful anionic surfactants include surfactants having a molecular structure that includes: (1) at least one hydrophobic moiety (e.g., an alkyl group having from 6 to 20 carbon atoms in a chain, alkylaryl group, alkenyl group, and combinations thereof), (2) at least one anionic group (e.g., sulfate, sulfonate, phosphate, polyoxyethylene sulfate, polyoxyethylene sulfonate, polyoxyethylene phosphate, and combinations thereof), (3) salts of such anionic groups (e.g., alkali metal salts, ammonium salts, tertiary amino salts, and combinations thereof), and combinations thereof.

Useful anionic surfactants include, e.g., fatty acid salts (e.g., sodium stearate and sodium dodecanoate), salts of carboxylates (e.g., alkylcarboxylates (carboxylic acid salts) and polyalkoxycarboxylates, alcohol ethoxylate carboxylates, and nonylphenol ethoxylate carboxylates); salts of sulfonates (e.g., alkylsulfonates (alpha-olefinsulfonate), alkylbenzenesulfonates (e.g., sodium dodecylbenzenesulfonate), alkylarylsulfonates (e.g., sodium alkylarylsulfonate), and sulfonated fatty acid esters); salts of sulfates (e.g., sulfated alcohols (e.g., fatty alcohol sulfates, e.g., sodium lauryl sulfate), salts of sulfated alcohol ethoxylates, salts of sulfated alkylphenols, salts of alkylsulfates (e.g., sodium dodecyl sulfate), sulfosuccinates, and alkylether sulfates), aliphatic soap, fluorosurfactants, anionic silicone surfactants, and combinations thereof.

Suitable commercially available anionic surfactants include sodium lauryl sulfate surfactants available under the trade designations TEXAPON L-100 from Henkel Inc.

(Wilmington, Del.) and STEPANOL WA-EXTRA from Stepan Chemical Co. (Northfield, Ill.), sodium lauryl ether sulfate surfactants available under the POLYSTEP B-12 trade designation from Stepan Chemical Co., ammonium lauryl sulfate surfactants available under the trade designation STANDAPOL A from Henkel Inc., sodium dodecyl benzene sulfonate surfactants available under the trade designation SIPONATE DS-10 from Rhone-Poulenc, Inc. (Cranberry, N.J.), decyl(sulfophenoxy)benzenesulfonic acid disodium salt available under the trade designation DOWFAX C10L from The Dow Chemical Company (Midland, Mich.).

The anionic surfactants are typically in the form of sodium salts, but may also be present in the form of other alkali metal or alkaline earth metal salts, for example magnesium salts, and in the form of ammonium or mono-, di-, tri- or tetraalkylammonium salts, in the case of the sulfonates, the anionic surfactant may also be in the form of their corresponding acid, for example dodecylbenzenesulfonic acid.

In some embodiments the anionic surfactant has the general formula $R^1OSO_3^-X^+$ wherein $R^1$ is a $C_8$-$C_{20}$ alkyl or alkenyl group and X is an alkali metal or alkaline earth metal such as sodium or potassium. One common aliphatic sulfate salt is depicted as follows:

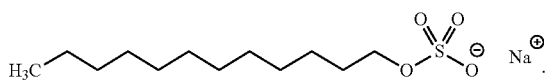

Low concentrations of surfactant(s) in combination with high concentrations of aqueous liquid phase are amenable to low (surfactant) residuals remaining on the substrate or article after cleaning.

In some embodiments, the cleaning composition typically comprises (e.g. nonionic and/or anionic) surfactant in an amount of at least 20, 25, 30, or 35% weight % solids based on the total amount of the described water soluble copolymer, hydrophilic silane, surfactant and alkali metal silicate when present. In some embodiments, the concentration of (e.g. nonionic and/or anionic) is no greater than 75, 70, or 60 weight %. When the composition is intended primarily for protection, low concentrations or no surfactant is present. In this embodiment, the amount of (e.g. nonionic and/or anionic) surfactant can be less than 15, 10, or 5 weight % solids.

In some embodiments, the weight ratio of nonionic surfactant to anionic surfactant can generally range from 1:10 to 10:1. In some embodiments, the weight ratio of nonionic surfactant to anionic surfactant is at least 1:1, 2:1, 3:1, 4:1, 5:1, 6:1, 7:1, 8:1, 9:1 or 10:1.

The composition may optionally comprise silicone and fluorochemical surfactants such as these available under the trade designation FLUORAD from 3M Company of St. Paul, Minn. may also be used.

Further, the composition may optionally comprise cationic surfactant and/or amphoteric surfactants.

Examples of useful cationic surfactants include dodecyl ammonium chloride, dodecyl ammonium bromide, dodecyl trimethyl ammonium bromide, dodecyl pyridinium chloride, dodecyl pyridinium bromide, hexadecyl trimethyl ammonium bromide, cationic quaternary amines, and combinations thereof.

Useful amphoteric surfactants include, e.g., amphoteric betaines (e.g., cocoamidopropyl betaine), amphoteric sultaines (cocoamidopropyl hydroxysultaine and cocoamidopropyl dimethyl sultaine), amphoteric imidazolines, and combinations thereof. A useful cocoamidopropyl dimethyl sultaine is commercially available under the LONZAINE CS trade designation from Lonza Group Ltd. (Basel, Switzerland). Useful coconut-based alkanolamide surfactants are commercially available from Mona Chemicals under the MONAMID 150-ADD trade designation). Other useful commercially available amphoteric surfactants include, e.g., caprylic glycinate (an example of which is available under the REWOTERIC AMV trade designation from Witco Corp.) and capryloamphodipropionate (an example of which is available under the AMPHOTERGE KJ-2 trade designation from Lonza Group Ltd.

However, in typical embodiments, the composition is free of silicone and/or fluorochemical surfactants and also free of cationic surfactant and/or amphoteric surfactants.

The composition may also optionally contain a preservative in an amount effective to prevent spoilage and growth of inadvertently added microorganisms. Illustrative preservatives include, but are not limited to, organic sulfur compound, halogenated compound, cyclic organic nitrogen compound, low molecular weight aldehyde, phenyl and phenoxy compound (e.g. methyl-p-hydrobenzoate; propyl-p-hydrobenzoate, and 2-phenoxyethanol), paraben, organic acid and its derivatives, iodophor, quaternary ammonium compound (e.g. quaternary ammonium salt such as dialkyl dimethyl ammonium chloride from Stepan Inc. (Northfield, Ill.) under the trade designation "BTC 818" and 3-(trihydroxysilyl)propyldimethyloctadecyl ammonium chloride from Gelest Inc. (Morrisville, Pa.), urea derivative, isothiazoline, alkyl substituted amino acid, formaldehyde, formaldehyde donors including 1-(3-chloroallyl)-3,5,7-azoniaadamantane chloride sold by Dow Chemical Company under the trade name DOWICIL 75, 1,3-bis(hydroxymethyl)-5,5-dimethylhydantoin, 1-(hydroxymethyl)-5,5-dimet-hyl hydantoin, 3-iodo-2-propynyl butyl carbamate, the combination of the preceding three being sold by Lonza under the trade name PANTOGARD PLUS LIQUID, hexahydro-1,3,5-tris (2-hydroxyethyl)-s-triazine sold under the trade name SURCIDE-P, or any combinations thereof.

In some embodiments, the composition comprises 1,2-benzisothiazolin-3-one (BIT) as can be obtained from Lonza Inc., Allendale, N.J. as an aqueous dipropylene glycol solution under the trade designation "PROXEL-GXL"; 2-methyl-4-isothiazolin-3-one and/or 2-methyl-3(2H) isothiazolinone as can be obtained from The Dow Chemical Co., Midland Mich. as an aqueous solution under the trade designation NEOLONE M-10; or 5-chloro-2-methyl-4-isothiazolin-3-one alone or together with 2-methyl-4-isothiazolin-3-one as can be obtained from The Dow Chemical Co., Midland Mich. under the trade designation "KATHON CG/ICP II"; or combinations thereof.

Preservative(s) are typically present in an amount about 0.001 weight percent to about 2 wt.-% solids based on the total weight of the composition. In some embodiments, such as when the preservative is a quaternary ammonium compound, the amount of preservative can range up to 5, 6, 7, 8, 9 or 10 wt.-% solids.

In some embodiments, the composition comprises at least one chelating agents. Various chelating agents are known such as ethylenediaminetetraacetic acid (EDTA), ethanoldiglycine diacid, diethylenetriamine pentaacetic acid (DTPA), nitrilotriacetic acid (NTA), aminotris(methylenephosphonic acid (ATMP), ethylenediamine-N,N'-disuccinic acid (EDDS), ethylene glycol tetraacetic acid (EGTA), as well as metal salts such as sodium citrate and zeolite compounds and combinations thereof. Chelating agent(s) are typically present in an amount about 0.001 weight percent to about 2 wt.-% solids based on the total weight of the composition.

In typical embodiments, the composition can provide relatively long lasting protection properties in the absence of silica nanoparticles. However, in other embodiments, the composition may comprise silica nanoparticles.

In some embodiments, the silica nanoparticles are "spherical", meaning having a spherical appearance, although minor amounts of flat spots and/or depressions may be present at the surface.

In order to minimize haze, the (e.g. spherical) silica nanoparticles preferably have a volume average particle diameter (that is, a $D_{50}$) of 60 nanometers (nm) or less. Preferably, the (e.g. spherical) silica particles have a volume average particle diameter in a range of from 0.5 to 60 nm, more preferably in a range of from 1 to 20 nm, and still more preferably in a range of from 2 to 10 nm. The silica nanoparticles may have any particle size distribution consistent with the above 60 nm volume average particle diameter; for example, the particle size distribution may be monomodal or polymodal.

Spherical silica particles in aqueous media (sols) are well known in the art and are available commercially; for example, as silica sols in water or aqueous alcohol solutions under the trade designations LUDOX from E. I. du Pont de Nemours and Co. of Wilmington, Del.), NYACOL from Nyacol Co. of Ashland, Mass. or NALCO from Nalco Chemical Co. of Naperville, Ill. One useful silica sol with a volume average particle size of 5 nm, a pH of 10.5, and a nominal solids content of 15 percent by weight, is available as NALCO 2326 from Nalco Chemical Co. Other useful commercially available silica sols include those available as NALCO 1115 and NALCO 1130 from Nalco Chemical Co., as REMASOL SP30 from Remet Corp. of Utica, N.Y., and as LUDOX SM from E. I. du Pont de Nemours and Co.

Non-aqueous spherical silica sols are spherical silica sol dispersions wherein the liquid phase is an organic solvent. Typically, the silica sol is chosen so that its liquid phase is compatible with the remaining components of the liquid phase. Typically, sodium-stabilized spherical silica particles should first be acidified prior to dilution with an organic solvent such as ethanol, as dilution prior to acidification may yield poor or non-uniform coatings. Ammonium-stabilized silica nanoparticles may generally be diluted and acidified in any order.

However, for uses wherein the transparency of the dried coating is of less importance, the silica nanoparticles may be non-spherical and/or may have a larger particle size, such as ranging up to 100, 200, or 300 nanometers. In this embodiment, natural and synthetic clay may be utilized as a source of the silica nanoparticles.

The silica nanoparticles may optionally comprise a surface treatment. However, in favored embodiments, the silica nanoparticles are free of surface treatment.

The weight ratio of (e.g. spherical) silica nanoparticles to the water-soluble copolymer, or a salt thereof, can be at least 50:50 or 60:40 or 70:30 and generally no greater than 97:3 or 95:5. In some embodiments, the weight ratio of (e.g. spherical) silica nanoparticles to the water-soluble copolymer ranges from 75:25 or 80:20 or 85:15 to 95:5.

One of ordinary skill in the art appreciates that when silica nanoparticles are present, the concentration of the primary components is proportionately reduced. The concentration of components can be readily calculated by one of ordinary skill in the art. For example, if the composition contains 15 wt.-% solids of nanoparticles, the concentration of other components is 85 wt-5% of the amounts previously described.

The composition optionally includes water insoluble abrasive particles, fillers, abrasives, thickening agents, builders (e.g., sodium tripolyphosphate, sodium carbonate, sodium silicate, and combinations thereof), sequestrates, bleach (e.g., chlorine, oxygen (i.e., non-chlorine bleach), and combinations thereof), pH modifiers, antioxidants, preservatives, fragrances, colorants (e.g., dyes), and combinations thereof.

Examples of suitable water insoluble abrasive particles include silica, perlite, calcium carbonate, calcium oxide, calcium hydroxide, pumice, and combinations thereof. The water insoluble abrasive particles may be present in an amount of at least 0.1, 0.5 or 1 wt.-% solids and typically are present in an amount no greater than 10, 9, 8, 7, 6, or 5 wt. % solids.

The compositions may optionally comprise a viscosity regulators including for example organic natural thickeners (agar-agar, carrageenan, tragacanth, gum Arabic, alginates, pectins, polyoses, guar, gu, locust bean gum, starch, dextrins, gelatin, casein), organically modified natural substances (carboxymethylcellulose and other cellulose ethers, hydroxyethyl-and-propylcellulose and the like, gum ethers), other water-soluble polymers (polyacrylic and polymethacrylic compounds, vinyl polymers, polyethers, polyimines, polyamides). However in typically embodiments the described water-soluble polymer is the sole water soluble polymer and the composition is free of other viscosity regulators such as organic natural thickeners.

The composition may also include various adjuvants as conventional for cleaning compositions. Examples of such adjuvants include one or more of a fragrance, preservative, dyes, corrosion inhibitors, antioxidants and the like. Adjuvants are generally present in an amount less than 2. 1.5, 1, or 0.5 wt.-% solids of the compositions.

Compositions according to the present disclosure may be made by any suitable mixing technique. One useful technique includes combining an aqueous solution of the water-soluble copolymer, or a salt thereof, with an aqueous or solvent borne dispersion of spherical silica particles, aqueous surfactant, and then adjusting the pH to the final desired level.

Compositions according to the present disclosure are useful for cleaning and/or providing a protective coating a substrate. In typical uses the composition is utilized for the purpose of cleaning a substrate and concurrently provides the protective coating. However, the composition could also be employed for only one of such purpose.

Referring now to FIG. 1, an article 100 comprises a substrate 120 having a layer 110 disposed thereon. Layer 110 is formed by applying a composition according to the present disclosure to a surface of a substrate and at least partially removing the aqueous liquid phase from the surface of a substrate.

Suitable substrates include various hard surfaces such as described in U.S. Pat. No. 6,955,834; incorporated herein by reference. Hard surfaces include for example, siliceous surfaces such as glass (for example, windows (including architectural and motor vehicle windows), ceramic (e.g. ceramic tile), cement, and stone; optical elements (e.g. lenses and mirrors), painted and/or clearcoat surfaces (e.g. automobile or truck body or closure panels, boat surfaces, motorcycle parts, truck tractors, snowmobiles, jet skis, off-road vehicles, and tractor trailers), appliances, plastic protective films which are backed with pressure-sensitive adhesives, metal (e.g. architectural columns, plumbing fixtures), fiberglass, thermosetting polymers, sheet molding compound, thermoplastics (e.g. polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. Additional exemplary substrates include bathtubs, toilets, sinks, faucets, mirrors, windows, and white boards, such as described in WO2011/163175; incorporated herein by reference.

The composition has found to be particularly suitable for both the tin and non-tin side of soda lime glass that is commonly used for windows.

In some embodiments, compositions according to the present disclosure, when coated on a substrate and at least partially dried, provide improved cleanability by way of a reduced tendency to accumulate dirt and other contaminants, such as soap scum and hard water mineral deposits. By "cleanable" it is meant that compositions as described herein, after drying, provide a coating which is easier to clean by contacting with flowing water or a water spray to readily displace overlying contamination, thereby removing a substantial portion of the contamination from the coating. The water sheeting effect allows dirt, toothpaste, cosmetics including lotions and lipstick, soap scum, and staining minerals in rainwater and rinse water to substantially sheet out and run off the substrate surface, which significantly reduces the amount and the localized concentration of contaminants that are deposited after the water dries.

In some embodiments, the composition provides an abrasion resistant layer that helps protect the substrate from damage from causes such as scratches, abrasion and solvents.

When protection is desired (in the absence of cleaning) the compositions can be applied to a surface of an article using conventional coating techniques, such as brush, bar, roll, wipe, curtain, rotogravure, spray, or dip coating techniques. One method is to apply the composition using any suitable method and, after allowing a portion of the solvent to evaporate, to rinse off excess composition with a stream of water, while the substrate is still fully or substantially wetted with the composition.

In some embodiments, the composition is utilized for both cleaning and protection. In this embodiment, the method generally comprises applying the composition to a surface of a substrate and at least partially removing the aqueous liquid phase from the surface of the substrate.

The method of removing an unwanted constituent from a surface of a substrate typically includes applying the composition to the substrate surface and the unwanted constituent and applying a mechanical action to the composition and the surface, and drying the surface. The mechanical action can be any suitable mechanical action including, e.g., wiping and rubbing, and the drying can occur through any suitable process including, e.g., allowing the surface to air dry, wiping the surface dry, contacting the surface with forced air (e.g., cooled or heated air ranging from 100° F. to 160° F.), and combinations thereof.

The resulting surface is free of, or substantially free of, the unwanted constituent, and exhibits an improved hydrophilicity relative to the untreated surface and an improved ease of cleaning relative to the untreated surface.

The method of removing can be a method of removing any of a variety of unwanted constituents such as a method of cleaning. The method can be used to remove a variety of contaminants from a siliceous surface including, e.g., dirt, soap scum, oil (e.g., skin oil and motor oil), wax, food residue (e.g., butter, lard, margarine, meat protein, vegetable protein, calcium carbonate, and calcium oxide), grease, ink (e.g., permanent marker ink, ball point pen ink, and felt tip pen ink), insect residue, alkaline earth metal carbonates, adhesives, soot, clay, pigments, and combinations thereof, a variety of surface irregularities and defects (e.g., pits, nicks, lines, scratches, and combinations thereof), and combinations thereof.

The method is also useful for a variety of specific applications including, e.g., removing a mark made by a marker from a board, removing environmental pollutants (e.g., oil and dirt) from glass (e.g., a window, windshield, eyeglasses, lens (e.g., camera lens, optical lens), and cooktop), and combinations thereof. Marks that can be removed include marks made by permanent markers, non-permanent markers, and combinations thereof. Writing boards that can be cleaned include, e.g., dry-erase boards and white-boards. Dry erase boards and white boards are described in many publications including, e.g., WO 2011/163175.

In some embodiments, compositions described herein can also be used for protecting a surface as well as cleaning the surface. This is particularly useful on a surface to which soap scum adheres. For example, a composition of the present disclosure can be applied to a surface with rubbing, for example to clean the surface (e.g., by removing soap scum), but upon drying the composition leaves a protective layer to which contaminants (e.g., soap scum) do not adhere as well. Upon repeated use, this can make the surface easier to clean and/or require less frequent cleaning.

In typical embodiments, the compositions are suitable for use in a consumer "spray and wipe" application as a cleaning composition. In such an application, the consumer generally applies an effective amount of the composition using the pump and within a few moments thereafter, wipes off the treated area with a cloth, towel, or sponge, usually a disposable paper towel or sponge. Such application materials are preferably acid-resistant and may be hydrophilic or hydrophobic in nature.

In certain applications, however, especially where undesirable stain deposits are heavy, the cleaning composition may be left on the stained area until it has effectively loosened the stain deposits after which it may then be wiped off, rinsed off, or otherwise removed. For particularly heavy deposits of such undesired stains, multiple applications may also be used. Optionally, after the composition has remained on the surface for a period of time, it could be rinsed or wiped from the surface.

The composition described herein can also be applied to a hard surface by the use of a carrier substrate. One example of a useful carrier substrate is a wet wipe. The wipe can be of a woven or non-woven nature. Fabric substrates can include non-woven or woven pouches, sponges including both closed cell and open celled sponges, including sponges formed from celluloses as well as other polymeric material, as well as in the form of abrasive or nonabrasive cleaning pads. Such fabrics are known commercially in this field and are often referred to as wipes. Such substrates can be resin bonded, hydroentangled, thermally bonded, meltblown, needlepunched, or any combination of the former. The carrier substrate useful with the present inventive compositions may also be a wipe which includes a film forming substrate such as a water soluble polymer. Such self-supporting film substrates may be sandwiched between layers of fabric substrates and heat sealed to form a useful substrate.

The liquid compositions of the present invention are advantageously absorbed onto the carrier substrate, i.e., a wipe to form a saturated wipe. The wipe can then be sealed individually in a pouch which can then be opened when needed or a multitude of wipes can be placed in a container for use on an as needed basis. The container, when closed, sufficiently sealed to prevent evaporation of any components from the compositions. In use, a wipe is removed from the container and then wiped across an area in need of treatment; in case of difficult to treat stains the wipe may be re-wiped across the area in need of treatment, or a plurality of saturated wipes may also be used.

Compositions according to the present disclosure are preferably applied to a substrate in a uniform average thickness varying from 50 to 5000 nanometers (nm), and more preferably less than 500 nm, in order to avoid visible interference color variations in the coated surface and/or hazy appearance, although other thicknesses may also be used.

The optimal average dry coating thickness is dependent upon the particular composition that is coated, but in general the average dry thickness of the composition is between 5 and 1000 nm, preferably 50 to 500 nm (for example, as estimated from atomic force microscopy and/or surface profilometry), although other thicknesses may be used. Above this range, the dry coating thickness variations typically cause optical interference effects, leading to visible iridescence (rainbow effect) of the dried coating which is particularly apparent on darker substrates. Below this range the dry coating thickness may be inadequate to confer sufficient durability for most substrates exposed to environmental wear.

After coating the surface of the substrate, the resultant article may be dried at ambient temperatures. Alternatively, the composition described herein may be dried at higher temperatures ranging from 100° F. to 150, 200 or 250° F.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials

ZWITTERIONIC SILANE, was prepared using a procedure like that described for Hydrophilic Silane Solution 1 in PCT publication WO2014/036448A1 to provide a 48 weight % aqueous solution of the silane.

LUREDUR AM NA, a medium molecular weight liquid anionic polymer, poly(acrylamide/acrylic acid) and approximately 15% actives, was obtained from BASF Corporation, Florham Park, N.J.

PAA 90/10, Poly(acrylamide/acrylic acid) 90:10, sodium salt (MW=200,000 g/mole, 10% carboxyl) was obtained from Polysciences Inc. of Warrington, Pa., and was diluted with water to a 10 weight % aqueous solution.

PAA 30/70, Poly(acrylamide/acrylic acid) 30:70, sodium salt (MW=200,000 g/mole, 70% carboxyl) was obtained from Polysciences Inc. of Warrington, Pa., and was diluted with water to a 10 weight % aqueous solution.

MIRAPOL SURF S-210, acrylic based copolymer (approximately 20% actives), was obtained from Rhodia, Inc., Cranbury, N.J.

LSS-75, an aqueous lithium silicate solution (22% actives), was obtained from Nissan Chemical Company, Houston, Tex.

GLUCOPON 425N, an aqueous solution of alkyl polyglucosides (50% actives, approximate molecular weight=488) based on a natural fatty alcohol C8-C16 (preserved with glutaraldehyde at approximately 0.012%), was obtained from BASF Corporation, Florham Park, N.J.

STEPANOL WA-EXTRA, an aqueous solution of sodium lauryl sulfate (29% actives, approximate molecular weight=288), was obtained from Stepan Company, Northfield, Ill.

TOMADOL 91-6, a C9-11 ethoxylated alcohol (100% actives), was obtained from Air Products and Chemicals, Inc., Allentown, Pa.

CP GLYCERIN, chemically pure glycerin, available from Sigma-Aldrich Corp., St. Louis, Mo.

IPA, 100% isosopropyl alcohol, available from Sigma-Aldrich Corp., St. Louis, Mo.

GREEN APPLE SZ43942, a green apple scented fragrance, was obtained from J&E Sozio, Piscataway Township, N.J.

LIQUITINT BLUE HP, a blue dye, was obtained from Milliken Chemical, Spartanburg, S.C.

PROXEL-GXL preservative, an aqueous dipropylene glycol solution of 1,2-benzisothiazolin-3-one (BIT) (20% actives), was obtained from Lonza Inc., Allendale, N.J.

NEOLONE M-10 preservative, a biocidal solution of 2-Methyl-4-isothiazolin-3-one and 2-Methyl-3(2H) isothiazolinone (9.5% actives in water), was obtained from The Dow Chemical Co., Midland Mich.

KATHON CG/ICP II preservative, a biocidal solution of 5-chloro-2-methyl-4-isothiazolin-3-one and 2-methyl-4-isothiazolin-3-one (1.5% total actives in water with 3-5% magnesium salts as a stabilizer), was obtained from The Dow Chemical Co., Midland Mich.

Test Methods

Soap Scum Test Method

A. Materials for Preparation of Soap Scum

Ivory bar soap (Procter and Gamble Co., Cincinnati, Ohio)

Synthetic sebum (Scientific Services S/D Inc., Sparrow Bush, New York)

Color Me Happy Herbal Essence Shampoo (Procter and Gamble, Cincinnati, Ohio)

Color Me Happy Herbal Essence Conditioner (Procter and Gamble, Cincinnati, Ohio)

Calcium chloride dihydrate (Sigma-Aldrich Corp., St. Louis, Mo.)

Magnesium nitrate hexahydrate (Sigma-Aldrich Corp., St. Louis, Mo.)

Oleic acid (Sigma-Aldrich Corp., St. Louis, Mo.)

Dust (ISO 12103-1, A2 Fines ID#10842F, Power Technology Inc., Burnsville, Minn.)

B. Preparation of Soap Scum

A 1000 g hard water solution comprising calcium chloride dehydrate (0.066% by weight) and magnesium nitrate hexahydrate (0.064% by weight) was first prepared. In a first vessel, crushed Ivory soap (1.99 g) was added into the aforementioned hard water solution (239.28 g) and the mixture was sonicated for 30 minutes at 60° C. Synthetic sebum (1.5 g) was then added into the mixture and the mixture was sonicated for another 10 minutes. In a second vessel, shampoo (1.99 g) was added into the aforementioned hard water solution (747.75 g) at 60° C. and the mixture was stirred for 15 seconds. Oleic acid (1.99 g) was then added into the mixture. The contents of both vessels were combined and stirred at 60° C. for 2 hours. Conditioner (5.00 g) was then added to the above combined mixture and was stirred at 41° C. for 15 minutes, followed by stirring at 45°

C. for another 15 minutes. Finally, dirt (0.50 g) was added into the mixture and the mixture was stirred for 10 minutes.

C: Preparation of Substrate Panels for Soap Scum Test

A new 6 inch (15.2 cm)×4 inch (10.2 cm) float glass panel (soda-lime glass) or a 4.25 inch (10.8 cm)×4.25 inch (10.8 cm) ceramic tile panel was thoroughly cleaned at least three times with IPA from a dispensing bottle by rinsing the surface and allowing it to dry after each cleaning. A rayon/polyester wipe (50/50, 40 grams/m² basis weight) was used to coat 0.3 g (approximately 12 drops) of the cleaning composition to be tested to cover a 5 inch (12.7 cm)×4 inch (10.2 cm) surface area of a glass panel. Alternatively, 0.18 g (approximately 7 drops) of the cleaning composition was similarly coated to cover a 4.25 inch (10.8 cm)×4.25 inch (10.8 cm) surface area of a tile panel. The cleaner was evenly wiped across the glass or tile surfaces in a defined pattern twice. Depending on the specific test, either the tin side (hydrophobic side) or the non-tin side (hydrophilic side) of a glass panel was used for the test. For a tile panel, the glazed side of the tile was used for the test. The coated panels were cured at room temperature for two hours before running the soap scum tests.

D. Soap Scum Test

A fixed amount of soap scum (10 trigger sprays) was sprayed onto the entire coated surface of the glass or tile panel with the panel in a flat position and the soap scum was then allowed to dwell on the panel for 6 minutes. The coated surface was then rinsed with running water and air dried in an upright position for 9 minutes at room temperature. The water sheeting performance (hydrophilicity) of the surface was measured and recorded by spraying deionized water onto the treated surface. After that, the sprayed surface of the panel was air dried in upright position for another 5 minutes. This was considered as 1 soap scum spray cycle. The amount of coating removed was estimated based on the percent surface area of the panel that appeared dry after a given spray cycle. The water sheeting performance was defined as 100% if no dryness was visually observed on the coated panel after 30 seconds when water was sprayed to cover the entire coated surface. As such, the percent of the coating removed during the cycle was defined as 0%. If the water sheeting performance was determined to be zero (glass or tile panel appeared dry), the amount of coating removed during the cycle was defined as 100%, and no additional soap scum spray cycles were carried out. If the water sheeting performance was not zero, soap scum spray cycles were repeated until the coated surface had lost more than 50% of its water sheeting performance (50% hydrophilicity or 50% coating loss).

E. Sample Preparation

Cleaning and protecting compositions having the formulations indicated in Tables were prepared by combining the ingredients followed by stirring. The material amounts for each example in the Table are in grams. Values that are not in parentheses are the amount of material added including any water if it was added as a solution. Values in parentheses are the weight in grams of the active material. For example, for Example E1, 0.6603 grams of a 15% aqueous solution of LUREDUR AM NA was added and the active amount was 0.0990 grams).

Examples E1 And E2 And Comparative Examples CE1-CE3

Examples E1 and E2 and Comparative Examples CE1-CE3 were prepared as described above having the compositions indicated in Table 1. The compositions were tested for soap scum performance as described in the Soap Scum Test above. Test results are provided in Tables 2-4.

TABLE 1

|  | E1 | CE1 | E2 | CE2 | CE3 |
|---|---|---|---|---|---|
| ZWITTERIONIC SILANE | 0.1003 | 0.1052 | 0.1961 | 0.1949 | 0 |
|  | (0.0481) | (0.0505) | (0.0941) | (0.0936) |  |
| LUREDUR AM NA | 0.6603 | 0 | 0.6717 | 0 | 0.6634 |
|  | (0.0990) |  | (0.1008) |  | (0.0995) |
| LSS-75 | 0.0434 | 0.0435 | 0.0433 | 0.0438 | 0.0436 |
|  | (0.0095) | (0.0096) | (0.0095) | (0.0096) | (0.0096) |
| CP GLYCERIN | 0.0062 | 0.0062 | 0.0062 | 0.0063 | 0.0062 |
| STEPANOL-WA EXTRA | 0.0875 | 0.0877 | 0.0873 | 0.0883 | 0.0878 |
|  | (0.0254) | (0.0254) | (0.0253) | (0.0256) | (0.0255) |
| TOMADOL 91-6 | 0.0751 | 0.0753 | 0.0749 | 0.0758 | 0.0754 |
| GLUCOPON 425N | 0.1876 | 0.1880 | 0.1872 | 0.1894 | 0.1883 |
|  | (0.0938) | (0.0940) | (0.0936) | (0.0947) | (0.0942) |
| IPA | 0.0624 | 0.0626 | 0.0623 | 0.0630 | 0.0627 |
| GREEN APPLE SZ43942 | 0.0026 | 0.0026 | 0.0025 | 0.0026 | 0.0026 |
| LIQUITINT BLUE HP | 0.0013 | 0.0013 | 0.0013 | 0.0014 | 0.0013 |
| PROXEL-GXL | 0.0501 | 0.0502 | 0.0500 | 0.0506 | 0.0503 |
| Water | 98.7231 | 99.3774 | 98.6171 | 99.2839 | 98.8183 |
| Total | 100.0000 | 100.0000 | 100.0000 | 100.0000 | 100.0000 |

TABLE 2

(% coating removed after each cycle - non-tin side of glass panel)

|  | # of cycles | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| E1 | 5 | 10 | 25 | 25 | 30 | 40 | 45 | 50 | | | | | |
| CE1 | 15 | 25 | 30 | 35 | 45 | 45 | 50 | | | | | | |
| E2 | 5 | 5 | 20 | 20 | 25 | 30 | 30 | 35 | 40 | 40 | 40 | 45 | 50 |
| CE2 | 10 | 20 | 40 | 45 | 55 | | | | | | | | |
| CE3 | 40 | 75 | | | | | | | | | | | |

TABLE 3

(% coating removed after each cycle - tin side of glass panel)

| | # of cycles | | | |
|---|---|---|---|---|
| | 1 | 2 | 3 | 4 |
| E1 | 10 | 30 | 65 | |
| CE1 | 90 | | | |
| E2 | 5 | 20 | 40 | 60 |
| CE2 | 90 | | | |
| CE3 | 10 | 35 | 70 | |

TABLE 4

(% coating removed after each cycle - tile panel)

| | # of cycles | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| E1 | 15 | 20 | 30 | 30 | 30 | 30 | 30 | 40 | 50 | | | | | |
| CE1 | 20 | 20 | 25 | 25 | 25 | 25 | 30 | 30 | 35 | 50 | | | | |
| E2 | 15 | 20 | 20 | 25 | 25 | 25 | 25 | 35 | 40 | 40 | 40 | 40 | 40 | 50 |
| CE2 | 15 | 15 | 15 | 15 | 15 | 15 | 25 | 30 | 30 | 30 | 30 | 35 | 50 | |
| CE3 | 15 | 30 | 60 | | | | | | | | | | | |

Examples E3-E8 and Comparative Examples CE4-CE8

Examples E3-E8 and Comparative Examples CE4-CE8 were prepared as described above having the compositions indicated in Tables 5 and 6. The compositions were tested for soap scum performance as described in the Soap Scum Test above. Test results are provided in Table 7. The data demonstrates the concentration effects of LUREDUR AM NA and zwitterionic silane on preventing soap scum on the tin side of a glass panel surface.

TABLE 5

| | E3 | E4 | E5 | E6 | E7 | E8 |
|---|---|---|---|---|---|---|
| ZWITTERIONIC SILANE | 0.1199 (0.0576) | 0.1199 (0.0576) | 0.1599 (0.0768) | 0.1599 (0.0768) | 0.2000 (0.0960) | 0.2000 (0.0960) |
| LUREDUR AM NA | 0.6700 (0.1005) | 1.3400 (0.2010) | 0.6600 (0.0990) | 1.3500 (0.2025) | 0.6700 (0.1005) | 1.3400 (0.2010) |
| LSS-75 | 0.0862 (0.0190) | 0.0862 (0.0190) | 0.0866 (0.0191) | 0.0866 (0.0191) | 0.0862 (0.0190) | 0.0862 (0.0190) |
| CP GLYCERIN | 0.0126 | 0.0126 | 0.0126 | 0.0126 | 0.0127 | 0.0127 |
| STEPANOL-WA EXTRA | 0.1750 (0.0508) | 0.1750 (0.0508) | 0.1750 (0.0508) | 0.1750 (0.0508) | 0.1752 (0.0508) | 0.1752 (0.0508) |
| TOMADOL 91-6 | 0.1520 | 0.1520 | 0.1499 | 0.1499 | 0.1500 | 0.1500 |
| GLUCOPON 425N | 0.3758 (0.1879) | 0.3758 (0.1879) | 0.3749 (0.1875) | 0.3749 (0.1875) | 0.3748 (0.1874) | 0.3748 (0.1874) |
| IPA | 0.1248 | 0.1248 | 0.1250 | 0.1250 | 0.1251 | 0.1251 |
| GREEN APPLE SZ43942 | 0.0049 | 0.0049 | 0.0049 | 0.0049 | 0.0051 | 0.0051 |
| LIQUITINT BLUE HP | 0.0026 | 0.0026 | 0.0023 | 0.0023 | 0.0029 | 0.0029 |
| NEOLONE M-10 | 0.1061 | 0.1061 | 0.1061 | 0.1061 | 0.1056 | 0.1056 |
| Water | 198.1828 | 197.5328 | 198.1132 | 197.5432 | 198.1325 | 197.4525 |
| Total | 200.0126 | 200.0326 | 199.9703 | 200.0903 | 200.0400 | 200.0300 |
| pH | 9.09 | 9.11 | 9.05 | 8.98 | 8.98 | 8.91 |

TABLE 6

| | CE4 | CE5 | CE6 | CE7 | CE8 |
|---|---|---|---|---|---|
| ZWITTERIONIC SILANE | 0.1199 (0.0576) | 0.1599 (0.0768) | 0.2000 (0.0960) | 0 | 0 |
| LUREDUR AM NA | 0 | 0 | 0 | 0.6600 (0.0990) | 1.5100 (0.2265) |
| LSS-75 | 0.0862 (0.0190) | 0.0866 (0.0191) | 0.0862 (0.0190) | 0.0863 (0.0190) | 0.0863 (0.0190) |
| CP GLYCERIN | 0.0126 | 0.0126 | 0.0127 | 0.0133 | 0.0133 |
| STEPANOL-WA EXTRA | 0.1750 (0.0508) | 0.1750 (0.0508) | 0.1752 (0.0508) | 0.1754 (0.0509) | 0.1754 (0.0509) |
| TOMADOL 91-6 | 0.1520 | 0.1499 | 0.1500 | 0.1500 | 0.1500 |
| GLUCOPON 425N | 0.3758 (0.1879) | 0.3749 (0.1875) | 0.3748 (0.1874) | 0.3754 (0.1877) | 0.3754 (0.1877) |
| IPA | 0.1248 | 0.1250 | 0.1251 | 0.1258 | 0.1258 |
| GREEN APPLE SZ43942 | 0.0049 | 0.0049 | 0.0051 | 0.0050 | 0.0050 |
| LIQUITINT BLUE HP | 0.0026 | 0.0023 | 0.0029 | 0.0025 | 0.0025 |

TABLE 6-continued

|  | CE4 | CE5 | CE6 | CE7 | CE8 |
|---|---|---|---|---|---|
| NEOLONE M-10 | 0.1061 | 0.1061 | 0.1056 | 0.1060 | 0.1060 |
| Water | 198.8528 | 198.8132 | 198.7525 | 198.3432 | 197.5832 |
| Total | 200.0126 | 200.0103 | 199.9900 | 200.0427 | 200.1327 |
| pH | 9.20 | 9.11 | 9.07 | 9.17 | 9.09 |

TABLE 7

(% coating removed after each cycle - tin side of glass panel)

|  | # of cycles | | | |
|---|---|---|---|---|
|  | 1 | 2 | 3 | 4 |
| E3 | 90 | | | |
| E4 | 10 | 35 | 60 | |
| E5 | 50 | | | |
| E6 | 10 | 45 | 65 | |
| E7 | 25 | 90 | | |
| E8 | 10 | 15 | 20 | 55 |
| CE4 | 90 | | | |
| CE5 | 90 | | | |
| CE6 | 90 | | | |
| CE7 | 50 | | | |
| CE8 | 10 | 50 | | |

Examples E9-E13 and Comparative Examples CE9-CE13

Examples E9-E13 and Comparative Examples CE9-CE14 were prepared as described above having the compositions indicated in Tables 8 and 9. The compositions were tested for soap scum performance as described in the Soap Scum Test above. Test results are provided in Table 10. The data demonstrates the concentration effect of the zwitterionic silane on the scum preventing performance of LUREDUR AM NA on a non-tin side of a glass panel surface.

TABLE 8

|  | E9 | CE9 | E10 | CE10 | E11 | CE11 |
|---|---|---|---|---|---|---|
| ZWITTERIONIC SILANE | 0.1200 (0.0576) | 0.1200 (0.0576) | 0.2008 (0.0964) | 0.2008 (0.0964) | 0.3000 (0.1440) | 0.3000 (0.1440) |
| LUREDUR AM NA | 1.3400 (0.2010) | 0 | 1.3300 (0.1995) | 0 | 1.3400 (0.2010) | 0 |
| LSS-75 | 0.0864 (0.0190) | 0.0864 (0.0190) | 0.0867 (0.0191) | 0.0867 (0.0191) | 0.0864 (0.0190) | 0.0864 (0.0190) |
| CP GLYCERIN | 0.0125 | 0.0125 | 0.0126 | 0.0126 | 0.0125 | 0.0125 |
| STEPANOL-WA EXTRA | 0.1750 (0.0508) | 0.1750 (0.0508) | 0.1757 (0.0510) | 0.1757 (0.0510) | 0.1750 (0.0508) | 0.1750 (0.0508) |
| TOMADOL 91-6 | 0.1500 | 0.1500 | 0.1506 | 0.1506 | 0.1500 | 0.1500 |
| GLUCOPON 425N | 0.3750 (0.1875) | 0.3750 (0.1875) | 0.3765 (0.1883) | 0.3765 (0.1883) | 0.3750 (0.1875) | 0.3750 (0.1875) |
| IPA | 0.1250 | 0.1250 | 0.1255 | 0.1255 | 0.1250 | 0.1250 |
| GREEN APPLE SZ43942 | 0.0050 | 0.0050 | 0.0050 | 0.0050 | 0.0050 | 0.0050 |
| LIQUITINT BLUE HP | 0.0024 | 0.0024 | 0.0024 | 0.0024 | 0.0024 | 0.0024 |
| NEOLONE M-10 | 0.1060 | 0.1060 | 0.1064 | 0.1064 | 0.1060 | 0.1060 |
| Water | 197.5127 | 198.8427 | 197.4478 | 198.7878 | 197.3627 | 198.6627 |
| Total | 200.0100 | 200.0000 | 200.0200 | 200.0300 | 200.0400 | 200.0000 |
| pH | 9.06 | 9.22 | 8.94 | 9.1 | 8.80 | 8.87 |

TABLE 9

|  | E12 | CE12 | E13 | CE13 |
|---|---|---|---|---|
| ZWITTERIONIC SILANE | 0.4000 (0.1920) | 0.4100 (0.1968) | 0.8000 (0.3840) | 0.8200 (0.3936) |
| LUREDUR AM NA | 1.3400 (0.2010) | 0 | 1.3300 (0.1995) | 0 |
| LSS-75 | 0.0867 (0.0191) | 0.0864 (0.0190) | 0.0867 (0.0191) | 0.0864 (0.0190) |
| CP GLYCERIN | 0.0126 | 0.0125 | 0.0126 | 0.0125 |
| STEPANOL-WA EXTRA | 0.1757 (0.0510) | 0.1750 (0.0508) | 0.1757 (0.0510) | 0.1750 (0.0508) |
| TOMADOL 91-6 | 0.1506 | 0.1500 | 0.1506 | 0.1500 |
| GLUCOPON 425N | 0.3765 (0.1883) | 0.3750 (0.1875) | 0.3765 (0.1883) | 0.3750 (0.1875) |
| IPA | 0.1255 | 0.1250 | 0.1255 | 0.1250 |
| GREEN APPLE SZ43942 | 0.0050 | 0.0050 | 0.0050 | 0.0050 |
| LIQUITINT BLUE HP | 0.0024 | 0.0024 | 0.0024 | 0.0024 |
| NEOLONE M-10 | 0.1064 | 0.1060 | 0.1064 | 0.1060 |
| Water | 197.2686 | 198.6327 | 196.8386 | 198.2327 |
| Total | 200.0500 | 200.0800 | 200.0100 | 200.0900 |
| pH | 8.70 | 8.76 | 8.40 | 8.42 |

TABLE 10

(% coating removed after each cycle - non-tin side of glass panel)

| | # of cycles | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| E9 | 5 | 15 | 35 | 50 | | | | | | | | | | |
| CE9 | 5 | 10 | 40 | 50 | | | | | | | | | | |
| E10 | 5 | 5 | 10 | 25 | 30 | 45 | 50 | | | | | | | |
| CE10 | 5 | 5 | 5 | 30 | 40 | 50 | | | | | | | | |
| E11 | 5 | 5 | 5 | 10 | 15 | 25 | 25 | 25 | 35 | 45 | 50 | | | |
| CE11 | 5 | 5 | 5 | 10 | 25 | 35 | 40 | 45 | 50 | | | | | |
| E12 | 5 | 5 | 5 | 5 | 15 | 20 | 25 | 25 | 30 | 35 | 40 | 45 | 50 | |
| CE12 | 5 | 5 | 5 | 10 | 20 | 25 | 30 | 30 | 40 | 50 | | | | |
| E13 | 5 | 5 | 10 | 10 | 15 | 15 | 25 | 30 | 30 | 35 | 40 | 50 | | |
| CE13 | 5 | 15 | 20 | 30 | 40 | 45 | 45 | 50 | | | | | | |

Examples E14-E18 and Comparative Examples CE14-CE18

Examples E14-E18 and Comparative Examples CE14-CE18 were prepared as described above having the compositions indicated in Tables 11 and 12. The compositions were tested for soap scum performance as described in the Soap Scum Test above. Test results are provided in Tables 13 and 14.

TABLE 11

| | E14 | E15 | E16 | E17 | E18 |
|---|---|---|---|---|---|
| ZWITTERIONIC SILANE | 0.1108 (0.0532) | 0.1107 (0.0531) | 0.2089 (0.1003) | 0.1997 (0.0959) | 0.1001 (0.0480) |
| PAA 90/10 | 1.0193 (0.1019) | 0 | 1.0056 (0.1006) | 0 | 0 |
| PAA 30/70 | 0 | 1.0131 (0.1013) | 0 | 1.0062 (0.1006) | 0 |
| MIRAPOL SURF S-210 | | | | | 0.5120 (0.1024) |
| LSS-75 | 0.0431 (0.0095) | 0.0433 (0.0095) | 0.0434 (0.0095) | 0.0433 (0.0095) | 0.0430 (0.0095) |
| CP GLYCERIN | 0.0062 | 0.0063 | 0.0063 | 0.0063 | 0.0062 |
| STEPANOL-WA EXTRA | 0.0870 (0.0252) | 0.0876 (0.0254) | 0.0878 (0.0255) | 0.0875 (0.0254) | 0.0869 (0.0252) |
| TOMADOL 91-6 | 0.0747 | 0.0752 | 0.0753 | 0.0751 | 0.0746 |
| GLUCOPON 425N | 0.1865 (0.0933) | 0.1877 (0.0939) | 0.1881 (0.0941) | 0.1876 (0.0938) | 0.1862 (0.0931) |
| IPA | 0.0623 | 0.0627 | 0.0628 | 0.0626 | 0.0622 |
| GREEN APPLE SZ43942 | 0.0027 | 0.0027 | 0.0027 | 0.0027 | 0.0027 |
| LIQUITINT BLUE HP | 0.0011 | 0.0011 | 0.0011 | 0.0011 | 0.0011 |
| KATHON CG/ICP II | 0.0339 | 0.0341 | 0.0341 | 0.0340 | 0.0338 |
| Water | 98.3919 | 98.3897 | 98.3060 | 98.2536 | 98.8887 |
| Total | 100.0195 | 100.0141 | 100.0222 | 99.9598 | 99.9976 |
| pH | 7.46 | 9.16 | 7.15 | 8.84 | 9.10 |

TABLE 12

| | CE14 | CE15 | CE16 | CE17 | CE18 |
|---|---|---|---|---|---|
| ZWITTERIONIC SILANE | 0.1009 (0.0484) | 0.2060 (0.0989) | 0 | 0 | 0 |
| PAA 90/10 | 0 | 0 | 1.0013 (0.1001) | 0 | 0 |
| PAA 30/70 | 0 | 0 | 0 | 1.0170 (0.1017) | 0 |
| MIRAPOL SURF S-210 | | | | | 0.5084 (0.1017) |
| LSS-75 | 0.0433 (0.0095) | 0.0434 (0.0095) | 0.0436 (0.0096) | 0.0433 (0.0095) | 0.0437 (0.0096) |
| CP GLYCERIN | 0.0063 | 0.0063 | 0.0063 | 0.0063 | 0.0063 |
| STEPANOL-WA EXTRA | 0.0876 (0.0254) | 0.0878 (0.0255) | 0.0881 (0.0255) | 0.0876 (0.0254) | 0.0884 (0.0256) |
| TOMADOL 91-6 | 0.0752 | 0.0753 | 0.0757 | 0.0752 | 0.0759 |
| GLUCOPON 425N | 0.1878 (0.0939) | 0.1881 (0.0941) | 0.1888 (0.0944) | 0.1877 (0.0939) | 0.1894 (0.0947) |
| IPA | 0.0627 | 0.0628 | 0.0630 | 0.0627 | 0.0632 |
| GREEN APPLE SZ43942 | 0.0027 | 0.0027 | 0.0027 | 0.0027 | 0.0027 |
| LIQUITINT BLUE HP | 0.0011 | 0.0011 | 0.0011 | 0.0011 | 0.0011 |

TABLE 12-continued

|  | CE14 | CE15 | CE16 | CE17 | CE18 |
|---|---|---|---|---|---|
| KATHON CG/ICP II | 0.0341 | 0.0341 | 0.0343 | 0.0341 | 0.344 |
| Water | 99.3846 | 99.3372 | 98.5026 | 98.4797 | 98.9806 |
| Total | 99.9863 | 100.0449 | 100.0076 | 99.9973 | 99.9943 |
| pH | 8.94 | 8.63 | 8.49 | 9.58 | 9.55 |

TABLE 13

(% coating removed after each cycle - non-tin side of glass panel)

| | \# of cycles | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| E14 | 0 | 5 | 15 | 25 | 40 | 55 | | | | | | | | |
| E15 | 0 | 5 | 5 | 25 | 30 | 35 | 40 | 40 | 45 | 50 | | | | |
| E16 | 0 | 5 | 5 | 5 | 20 | 25 | 30 | 30 | 30 | 35 | 45 | 50 | | |
| E17 | 0 | 5 | 5 | 10 | 15 | 15 | 20 | 20 | 20 | 25 | 30 | 35 | 40 | 50 |
| E18 | 0 | 0 | 5 | 15 | 30 | 50 | | | | | | | | |
| CE14 | 20 | 50 | | | | | | | | | | | | |
| CE15 | 5 | 5 | 5 | 10 | 25 | 35 | 40 | 40 | 45 | 50 | | | | |
| CE16 | 90 | | | | | | | | | | | | | |
| CE17 | 90 | | | | | | | | | | | | | |
| CE18 | 5 | 30 | 50 | | | | | | | | | | | |

TABLE 14

(% coating removed after each cycle - tin side of glass panel)

| | \# of cycles | | | | | |
|---|---|---|---|---|---|---|
|  | 1 | 2 | 3 | 4 | 5 | 6 |
| E14 | 5 | 30 | 50 | | | |
| E15 | 0 | 5 | 10 | 35 | 55 | |
| E16 | 5 | 20 | 50 | | | |
| E17 | 5 | 5 | 10 | 20 | 40 | 55 |
| E18 | 20 | 55 | | | | |
| CE14 | 90 | | | | | |
| CE15 | 90 | | | | | |
| CE16 | 10 | 55 | | | | |
| CE17 | 5 | 45 | 50 | | | |
| CE18 | 90 | | | | | |

Examples E19 and E20 and Comparative Examples CE19-CE21

Examples E19 and E20 and Comparative Examples CE19-CE21 were prepared as described above having the compositions indicated in Table 15. The compositions were tested for soap scum performance as described in the Soap Scum Test above. Test results are provided in Tables 16 and 17.

TABLE 15

|  | E19 | CE19 | E20 | CE20 | CE21 |
|---|---|---|---|---|---|
| ZWITTERIONIC SILANE | 0.1024 (0.0492) | 0.1094 (0.0525) | 0.1942 (0.0932) | 0.1966 (0.0944) | 0 |
| LUREDUR | 0.6923 | 0 | 0.8123 | 0 | 0.7111 |
| AM NA | (0.1038) | | (0.1218) | | (0.1067) |
| LSS-75 | 0.0434 (0.0095) | 0.0434 (0.0095) | 0.0436 (0.0096) | 0.0429 (0.0094) | 0.043 (0.0095) |
| CP | 0.0064 | 0.0063 | 0.0064 | 0.0063 | 0.0063 |
| GLYCERIN | | | | | |
| IPA | 0.0631 | 0.0631 | 0.0634 | 0.0624 | 0.0626 |
| Water | 99.1323 | 99.3979 | 99.0374 | 99.6906 | 99.4073 |
| Total | 100.0399 | 100.0107 | 100.1573 | 99.9988 | 100.2303 |

TABLE 16

(% coating removed after each cycle - non-tin side of glass panel)

| | \# of cycles | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| E19 | 5 | 10 | 15 | 15 | 20 | 30 | 40 | 45 | 50 | | | | |
| CE19 | 20 | 40 | 45 | 50 | | | | | | | | | |
| E20 | 0 | 5 | 10 | 10 | 15 | 20 | 25 | 25 | 30 | 30 | 40 | 45 | 50 |
| CE20 | 10 | 20 | 40 | 45 | 50 | | | | | | | | |
| CE21 | 60 | | | | | | | | | | | | |

TABLE 17

(% coating removed after each cycle - tin side of glass panel)

| | \# of cycles | | | | | | | |
|---|---|---|---|---|---|---|---|---|
|  | 1 | 2 | 3 | 4 | 5 | 6 | 7 | 8 |
| E19 | 40 | 60 | | | | | | |
| CE19 | 90 | | | | | | | |
| E20 | 10 | 15 | 20 | 25 | 25 | 30 | 40 | 50 |
| CE20 | 90 | | | | | | | |
| CE21 | 40 | 80 | | | | | | |

The weight-% solids for each of the examples is reported in the following Tables 18-23.

TABLE 18-23

|  | E1 | E2 | E3 | E4 | E5 |
|---|---|---|---|---|---|
| ZWITTERIONIC SILANE | 0.0481 g 14% | 0.0941 g 24% | 0.0576 g 10% | 0.0576 g 9% | 0.0768 g 13% |
| LUREDUR AM NA | 0.0990 g 28% | 0.1008 g 25% | 0.1005 g 18% | 0.2010 g 30% | 0.0990 g 17% |
| SILANE:COPOLYMER | 1:2.1 | 1:1.1 | 1:1.7 | 1:3.5 | 1:1.3 |
| LSS-75 | 0.0095 g 3% | 0.0095 g 2% | 0.0190 g 3% | 0.0190 g 3% | 0.0191 g 3% |
| STEPANOL-WA EXTRA | 0.0254 g | 0.0253 g | 0.0508 g | 0.0508 g | 0.0508 g |
| TOMADOL 91-6 | 0.0751 g | 0.0749 g | 0.1520 g | 0.1520 g | 0.1499 g |
| GLUCOPON 425N | 0.0938 g | 0.0936 g | 0.1879 g | 0.1879 g | 0.1875 g |
| TOTAL SURFACTANT | 0.1943 g 55% | 0.1938 g 49% | 0.3907 g 69% | 0.3907 g 58% | 0.3882 g 67% |
| TOTAL SOLIDS (silane + copolymer + silicate + total surfactant) | 0.3509 g | 0.3982 g | 0.5678 g | 0.6683 g | 0.5831 g |

TABLE 19

| Protection Compositions | | | | | |
|---|---|---|---|---|---|
|  | E6 | E7 | E8 | E9 | E10 |
| ZWITTERIONIC SILANE | 0.0768 g 11% | 0.0960 g 16% | 0.0960 g 14% | 0.0576 g 9% | 0.0964 g 14% |
| LUREDUR AM NA | 0.2025 g 29% | 0.1005 g 17% | 0.2010 g 29% | 0.2010 g 30% | 0.1995 g 28% |
| SILANE:COPOLYMER | 1:2.6 | 1:1.0 | 1:2.1 | 1:3.5 | 1:2.1 |
| LSS-75 | 0.0191 g 3% | 0.0190 g 3% | 0.0190 g 3% | 0.0190 g 3% | 0.0191 g 3% |
| STEPANOL-WA EXTRA | 0.0508 g | 0.0508 g | 0.0508 g | 0.0508 g | 0.0510 g |
| TOMADOL 91-6 | 0.1499 g | 0.1500 g | 0.1500 g | 0.1500 | 0.1506 g |
| GLUCOPON 425N | 0.1875 g | 0.1874 g | 0.1874 g | 0.1875 g | 0.1883 g |
| TOTAL SURFACTANT | 0.3882 g 57% | 0.3882 g 64% | 0.3882 g 55% | 0.3883 g 58% | 0.3899 g 55% |
| TOTAL SOLIDS (silane + copolymer + silicate + total surfactant) | 0.6866 g | 0.6037 g | 0.7042 | 0.6659 g | 0.7049 g |

TABLE 20

|  | E11 | E12 | E13 |
|---|---|---|---|
| ZWITTERIONIC SILANE | 0.1440 g 19% | 0.1920 g 24% | 0.3840 g 39% |
| LUREDUR AM NA | 0.2010 g 27% | 0.2010 g 25% | 0.1995 g 20% |
| SILANE:COPOLYMER | 1:1.4 | 1:1.0 | 1.9:1 |
| LSS-75 | 0.0190 g 3% | 0.0191 g 2% | 0.0191 g 2% |
| STEPANOL-WA EXTRA | 0.0508 g | 0.0510 g | 0.0510 g |
| TOMADOL 91-6 | 0.1500 g | 0.1506 g | 0.1506 g |
| GLUCOPON 425N | 0.1875 g | 0.1883 g | 0.1883 g |
| TOTAL SURFACTANT | 0.3883 g 52% | 0.3899 g 49% | 0.3899 g 39% |
| TOTAL SOLIDS (silane + copolymer + silicate + total surfactant) | 0.7523 g | 0.8020 g | 0.9925 g |

TABLE 21

|  | E14 | E15 | E16 | E17 | E18 |
|---|---|---|---|---|---|
| ZWITTERIONIC SILANE | 0.0532 g 15% | 0.0531 g 15% | 0.1003 g 25% | 0.0959 g 24% | 0.0480 g 14% |
| PAA 90/10 | 0.1019 g 28% | 0 g | 0.1006 g 25% | 0 g | 0 g |
| PAA 30/70 | 0 g | 0.1013 g 28% | 0 g | 0.1006 g 25% | 0 g |
| MIRAPOL SURF S-210 | 0 g | 0 g | 0 g | 0 g | 0.1024 g 29% |
| SILANE:COPOLYMER | 1:1.9 | 1:1.9 | 1:1.0 | 1:1.0 | 1:2.1 |
| LSS-75 | 0.0095 g 3% | 0.0095 g 3% | 0.0095 g 2% | 0.0095 g 2% | 0.0095 g 3% |

TABLE 21-continued

|  | E14 | E15 | E16 | E17 | E18 |
|---|---|---|---|---|---|
| STEPANOL-WA EXTRA | 0.0252 g | 0.0254 g | 0.0255 g | 0.0254 g | 0.0252 g |
| TOMADOL 91-6 | 0.0747 g | 0.0752 g | 0.0753 g | 0.0751 g | 0.0746 g |
| GLUCOPON 425N | 0.0933 g | 0.0939 g | 0.0941 g | 0.0938 g | 0.0931 g |
| TOTAL SURFACTANT | 0.1932 g 54% | 0.1945 g 54% | 0.1949 g 48% | 0.1943 g 49% | 0.1929 g 55% |
| TOTAL SOLIDS (silane + copolymer + silicate + total surfactant) | 0.3578 g | 0.3584 g | 0.4053 g | 0.4003 g | 0.3528 g |

TABLE 22

|  | CE14 | CE15 | CE16 | CE17 | CE18 |
|---|---|---|---|---|---|
| ZWITTERIONIC SILANE | 0.0484 g 19% | 0.0989 g 33% | 0 g | 0 g | 0 g |
| PAA 90/10 | 0 g | 0 g | 0.1001 g 33% | 0 g | 0 g |
| PAA 30/70 | 0 g | 0 g | 0 g | 0.1017 g 33% | 0 g |
| MIRAPOL SURF S-210 | 0 g | 0 g | 0 g | 0 g | 0.1017 g 33% |
| SILANE:COPOLYMER | — | — | — | — | — |
| LSS-75 | 0.0095 g 4% | 0.0095 g 3% | 0.0096 g 3% | 0.0095 g 3% | 0.0096 g 3% |
| STEPANOL-WA EXTRA | 0.0254 g | 0.0255 g | 0.0255 g | 0.0254 g | 0.0256 g |
| TOMADOL 91-6 | 0.0752 g | 0.0753 g | 0.0757 g | 0.0752 g | 0.0759 g |
| GLUCOPON 425N | 0.0939 g | 0.0941 g | 0.0944 g | 0.0939 g | 0.0947 g |
| TOTAL SURFACTANT | 0.1945 g 77% | 0.1949 g 64% | 0.1956 g 64% | 0.1944 g 64% | 0.1962 g 64% |
| TOTAL SOLIDS (silane + copolymer + silicate + total surfactant) | 0.2524 g | 0.3033 g | 0.3053 g | 0.3056 g | 0.3075 g |

TABLE 23

| Protection Compositions | | |
|---|---|---|
|  | E19 | E20 |
| ZWITTERIONIC SILANE | 0.0492 g 30% | 0.0932 g 42% |
| LUREDUR AM NA | 0.1038 g 64% | 0.1218 g 54% |
| SILANE:COPOLYMER | 1:2.1 | 1:1.3 |
| LSS-75 | 0.0095 g 6% | 0.0096 g 4% |
| TOTAL SOLIDS (silane + copolymer + silicate) | 0.1625 g | 0.2246 g |

What is claimed is:

1. A composition comprising:
    a liquid phase;
    a water-soluble copolymer of an ethylenically unsaturated acidic monomer and an ethylenically unsaturated monomer comprising a nitrogen-containing terminal group, or salt thereof; and
    a hydrophilic zwitterionic silane component;
    wherein the composition is absent of silica nanoparticles.

2. The composition of claim 1 wherein the ethylenically unsaturated monomer comprising a nitrogen-containing terminal group is acrylamide represented by the formula

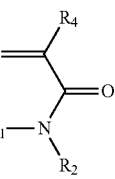

wherein $R_4$ is H or methyl; and
$R_1$ and $R_2$ are independently selected from H; $C_1$-$C_3$ alkyl; or $R_3SO_3H$, wherein $R_3$ is alkylene having from 2 to 6 carbon atoms.

3. The composition of claim 2 wherein the water-soluble copolymer has the general formula

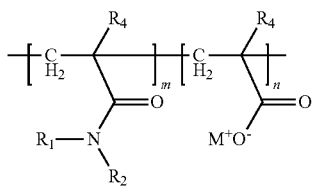

wherein $R_4$ is H or methyl;
$R_1$ and $R_2$ are independently selected from H; $C_1$-$C_3$ alkyl; —$CH_2OH$, or $R_3SO_3H$, wherein $R_3$ is alkylene having from 2 to 6 carbon atoms; and
$M^+$ is a cation.

4. The composition of claim 1 wherein the ethylenically unsaturated monomer comprising a nitrogen-containing terminal group comprises a quaternized ammonium terminal group and is represented by the formula

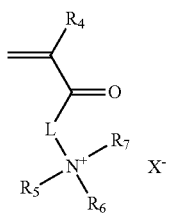

wherein $R_4$ is H or methyl;
L is a divalent atom or linking group;
$R_5$, $R_6$, and $R_7$ are independently selected from $C_1$-$C_4$ alkyl; and
$X^-$ is an anion.

5. The composition of claim 4 wherein the water-soluble copolymer has the general formula

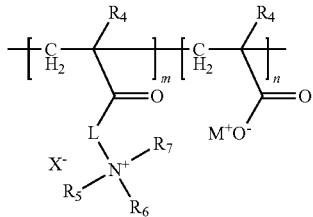

wherein $R_4$ is H or methyl;
L is a divalent atom or linking group;
$R_5$, $R_6$, and $R_7$ are independently selected from $C_1$-$C_4$ alkyl;

$X^-$ is an anion; and
$M^+$ is a cation.

6. The composition of claim 1 wherein the water-soluble copolymer has a weight ratio of ethylenically unsaturated acidic monomer to ethylenically unsaturated monomer comprising a nitrogen-containing terminal group in a range of from 5:95 to 95:5.

7. The composition of claim 1 wherein the liquid carrier comprises at least 50 percent by weight water.

8. The composition of claim 1 wherein the hydrophilic zwitterionic silane component is present in an amount ranging from 5 to 50 weight % solids.

9. The composition of claim 1 wherein the composition further comprises a sulfonate-functional silane.

10. The composition of claim 1 wherein the hydrophilic zwitterionic silane is a sulfonate-functional zwitterionic silane.

11. The composition of claim 1 wherein the composition further comprises surfactant.

12. The composition of claim 11 wherein the composition comprises nonionic surfactant and anionic surfactant.

13. The composition of claim 1 wherein the composition comprises an alkyl polysaccharide nonionic surfactant.

14. The composition of claim 1 further comprising a preservative, an alkali metal silicate, silica nanoparticles, or a combination thereof.

15. A method of protecting and optionally cleaning an article, the method comprising applying the composition of claim 1 to a surface of a substrate and at least partially removing the aqueous liquid phase from the surface of the substrate.

16. The method of claim 15 further comprising rubbing the composition on the surface.

17. The method of claim 15 wherein the surface comprises at least one of glass, metal, ceramic, wood, or an organic polymeric material.

18. The method of claim 15 wherein the substrate is selected from the group consisting of shower surrounds, bathtubs, toilets, sinks, faucets, windows, mirrors, appliances, and countertops.

19. An article comprising a coating comprising the dried composition of claim 1.

* * * * *